United States Patent
Akiyama et al.

(10) Patent No.: US 11,024,161 B2
(45) Date of Patent: *Jun. 1, 2021

(54) MANAGEMENT OF MOBILE OBJECTS

(71) Applicant: INTERNATIONAL BUSINESS MACHINES CORPORATION, Armonk, NY (US)

(72) Inventors: Kazuhito Akiyama, Machida (JP); Mari Abe Fukuda, Tokyo (JP); Hiroya Ogihara, Kawasaki (JP); Taku Sasaki, Machida (JP); Asuka Unno, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,022

(22) Filed: Jan. 13, 2020

(65) Prior Publication Data

US 2020/0152055 A1 May 14, 2020

Related U.S. Application Data

(63) Continuation of application No. 15/629,089, filed on Jun. 21, 2017, now Pat. No. 10,546,488.

(51) Int. Cl.
*G08G 1/01* (2006.01)
*G08G 1/09* (2006.01)
(Continued)

(52) U.S. Cl.
CPC ....... *G08G 1/0125* (2013.01); *G01C 21/3415* (2013.01); *G01C 21/3626* (2013.01);
(Continued)

(58) Field of Classification Search
None
See application file for complete search history.

(56) References Cited

U.S. PATENT DOCUMENTS

| 4,350,970 A | 9/1982 | Von Tomkewitsch |
| 4,907,159 A | 3/1990 | Mauge |

(Continued)

FOREIGN PATENT DOCUMENTS

| CN | 102147260 A | 8/2011 |
| CN | 102231231 A | 11/2011 |

(Continued)

OTHER PUBLICATIONS

Intellectual Propery Office, "Patents Act 1977: Examination Report under Section 18(3)", dated Feb. 25, 2020, 5 pages, GB Application No. GB2000666.4.

(Continued)

*Primary Examiner* — Aniss Chad
*Assistant Examiner* — Kelly D Williams
(74) *Attorney, Agent, or Firm* — Erik K. Johnson

(57) ABSTRACT

An embodiment of the invention may include a method, computer program product and computer system for managing mobile objects. The embodiment may identify, by an event agent (EA), an event occurring in a geographic space in which a plurality of mobile objects move. The embodiment may include determining the event is an expected event based on predicting time-series changes of the event handled by the EA. The embodiment may manage the one mobile object based on the expected event.

20 Claims, 21 Drawing Sheets

(51) Int. Cl.
*G01C 21/36* (2006.01)
*G01C 21/34* (2006.01)
*G08G 1/0967* (2006.01)
*G08G 1/0968* (2006.01)
*H04B 1/3822* (2015.01)
*G08G 1/14* (2006.01)
*H04L 29/08* (2006.01)
*H04W 4/021* (2018.01)
*H04W 4/40* (2018.01)

(52) U.S. Cl.
CPC .......... *G08G 1/012* (2013.01); *G08G 1/0112* (2013.01); *G08G 1/0133* (2013.01); *G08G 1/0141* (2013.01); *G08G 1/09* (2013.01); *G08G 1/096741* (2013.01); *G08G 1/096775* (2013.01); *G08G 1/096827* (2013.01); *G08G 1/096838* (2013.01); *G08G 1/096844* (2013.01); *G08G 1/143* (2013.01); *G08G 1/146* (2013.01); *H04B 1/3822* (2013.01); *H04L 67/12* (2013.01); *H04W 4/021* (2013.01); *H04W 4/40* (2018.02)

(56) References Cited

U.S. PATENT DOCUMENTS

| | | |
|---|---|---|
| 5,164,904 A | 11/1992 | Sumner |
| 5,173,691 A | 12/1992 | Sumner |
| 5,247,439 A | 9/1993 | Gurmu |
| 5,289,183 A | 2/1994 | Hassett |
| 5,610,821 A | 3/1997 | Gazis |
| 6,028,550 A | 2/2000 | Froeberg |
| 6,138,163 A | 10/2000 | Nam |
| 6,150,961 A | 11/2000 | Alewine |
| 6,317,058 B1 | 11/2001 | Lemelson |
| 6,480,783 B1 | 11/2002 | Myr |
| 6,680,674 B1 | 1/2004 | Park |
| 6,906,709 B1 | 6/2005 | Larkin |
| 7,096,115 B1 | 8/2006 | Groth |
| 7,277,938 B2 | 10/2007 | Duimovich |
| 7,395,151 B2 | 7/2008 | O'Neill |
| 7,447,588 B1 | 11/2008 | Xu |
| 7,466,244 B2 | 12/2008 | Kimchi |
| 7,564,377 B2 | 7/2009 | Kimchi |
| 7,689,348 B2 | 3/2010 | Boss |
| 7,710,421 B2 | 5/2010 | Muramatsu |
| 7,788,109 B2 | 8/2010 | Jakobson |
| 7,899,611 B2 | 3/2011 | Downs |
| 7,979,172 B2 | 7/2011 | Breed |
| 8,000,887 B2 | 8/2011 | Nathan |
| 8,103,445 B2 | 1/2012 | Smith |
| 8,396,652 B2 | 3/2013 | Nomura |
| 8,428,876 B2 | 4/2013 | Lee |
| 8,606,727 B2 | 12/2013 | Wu |
| 8,612,278 B1 | 12/2013 | Ashley, Jr. |
| 8,620,510 B1 | 12/2013 | Meuth |
| 8,626,704 B2 | 1/2014 | Sawai |
| 8,630,958 B2 | 1/2014 | Carlsson |
| 8,768,012 B2 | 7/2014 | Satoh |
| 8,793,046 B2 | 7/2014 | Lombrozo |
| 8,799,246 B2 | 8/2014 | Nomura |
| 8,818,608 B2 | 8/2014 | Cullinane |
| 8,843,309 B2 | 9/2014 | Kimchi |
| 8,850,011 B2 | 9/2014 | Kimchi |
| 8,850,013 B2 | 9/2014 | Waldman |
| 8,862,146 B2 | 10/2014 | Shatsky |
| 8,903,431 B2 | 12/2014 | Koch |
| 8,903,593 B1 | 12/2014 | Addepalli |
| 8,930,269 B2 | 1/2015 | He |
| 8,934,754 B2 | 1/2015 | Billau |
| 8,938,443 B2 | 1/2015 | Etzion |
| 8,988,252 B2 | 3/2015 | Scholl |
| 8,989,053 B1 | 3/2015 | Skaaksrud |
| 8,995,662 B2 | 3/2015 | Rubin |
| 9,041,812 B2 | 5/2015 | Billau |
| 9,058,703 B2 | 6/2015 | Ricci |
| 9,104,965 B2 | 8/2015 | Fritsch |
| 9,154,909 B2 | 10/2015 | Fulger |
| 9,172,398 B2 | 10/2015 | Miyazaki |
| 9,280,567 B2 | 3/2016 | Fischer |
| 9,384,609 B2 | 7/2016 | Ricci |
| 9,424,521 B2 | 8/2016 | Bloomquist |
| 9,460,616 B1 | 10/2016 | Miyahira |
| 9,467,839 B1 | 10/2016 | Nishimura |
| 9,494,439 B1 | 11/2016 | Ross |
| 9,497,170 B2 | 11/2016 | Akiyama |
| 9,497,590 B1 | 11/2016 | Gotoh |
| 9,497,591 B1 | 11/2016 | Gotoh |
| 9,507,808 B2 | 11/2016 | Fischer |
| 9,513,134 B1 | 12/2016 | Ishikawa |
| 9,538,327 B1 | 1/2017 | Gotoh |
| 9,562,775 B2 | 2/2017 | Gotoh |
| 9,576,482 B2 | 2/2017 | Yamamoto |
| 9,578,093 B1 | 2/2017 | Gotoh |
| 9,584,977 B2 | 2/2017 | Yamamoto |
| 9,615,215 B2 | 4/2017 | Yuen |
| 9,638,533 B2 | 5/2017 | Gotoh |
| 9,639,537 B2 | 5/2017 | Gotoh |
| 9,640,073 B2 | 5/2017 | Gueziec |
| 9,646,402 B2 | 5/2017 | Gotoh |
| 9,646,493 B2 | 5/2017 | Yamamoto |
| 9,659,016 B2 | 5/2017 | Gotoh |
| 9,668,103 B1 | 5/2017 | Edwards |
| 9,674,812 B2 | 6/2017 | Skaaksrud |
| 9,678,986 B2 | 6/2017 | Hancock |
| 9,681,104 B2 | 6/2017 | Billau |
| 9,868,394 B1 | 1/2018 | Fields |
| 9,868,446 B1 | 1/2018 | Zhu |
| 9,882,818 B2 | 1/2018 | Shao |
| 10,168,424 B1 | 1/2019 | Akiyama |
| 10,320,813 B1 | 6/2019 | Ahmed |
| 10,339,810 B2 | 7/2019 | Akiyama |
| 10,585,180 B2 | 3/2020 | Akiyama |
| 10,600,322 B2 | 3/2020 | Hosokawa |
| 2001/0029425 A1 | 10/2001 | Myr |
| 2002/0161833 A1 | 10/2002 | Niven |
| 2005/0027434 A1 | 2/2005 | Hirose |
| 2005/0027447 A1* | 2/2005 | Hirose .............. G01S 19/48 701/423 |
| 2005/0065711 A1 | 3/2005 | Dahlgren |
| 2005/0195821 A1 | 9/2005 | Yun |
| 2005/0222933 A1 | 10/2005 | Wesby |
| 2006/0158330 A1 | 7/2006 | Gueziec |
| 2007/0038363 A1 | 2/2007 | McGrath |
| 2007/0067373 A1 | 3/2007 | Higgins |
| 2007/0109303 A1 | 5/2007 | Muramatsu |
| 2007/0208492 A1 | 9/2007 | Downs |
| 2007/0208496 A1 | 9/2007 | Downs |
| 2007/0225912 A1 | 9/2007 | Grush |
| 2007/0241932 A1 | 10/2007 | Otero |
| 2008/0046134 A1 | 2/2008 | Bruce |
| 2008/0088480 A1 | 4/2008 | Rozum |
| 2008/0114530 A1 | 5/2008 | Petrisor |
| 2008/0248815 A1 | 10/2008 | Busch |
| 2008/0255754 A1 | 10/2008 | Pinto |
| 2009/0070024 A1 | 3/2009 | Burchard |
| 2009/0167597 A1 | 7/2009 | Strachan |
| 2009/0210477 A1 | 8/2009 | White |
| 2009/0248758 A1 | 10/2009 | Sawai |
| 2009/0254971 A1 | 10/2009 | Herz |
| 2009/0282125 A1 | 11/2009 | Jeide |
| 2009/0287405 A1 | 11/2009 | Liu |
| 2009/0327918 A1 | 12/2009 | Aaron |
| 2010/0011031 A1 | 1/2010 | Huang |
| 2010/0036578 A1 | 2/2010 | Taguchi |
| 2010/0036595 A1 | 2/2010 | Coy |
| 2010/0063715 A1 | 3/2010 | Wynter |
| 2010/0069035 A1 | 3/2010 | Johnson |
| 2010/0087981 A1 | 4/2010 | Orozco-Perez |
| 2010/0100310 A1 | 4/2010 | Eich |
| 2010/0188265 A1 | 7/2010 | Hill |
| 2010/0199213 A1 | 8/2010 | Suzuki |
| 2011/0037619 A1 | 2/2011 | Ginsberg |

(56) References Cited

U.S. PATENT DOCUMENTS

| | | |
|---|---|---|
| 2011/0047230 A1 | 2/2011 | McGee |
| 2011/0137557 A1 | 6/2011 | De Los Reyes |
| 2011/0191011 A1 | 8/2011 | McBride |
| 2011/0205040 A1 | 8/2011 | Van Wiemeersch |
| 2011/0208419 A1 | 8/2011 | Boss |
| 2011/0285591 A1 | 11/2011 | Wong |
| 2011/0298637 A1 | 12/2011 | Posner |
| 2011/0301770 A1 | 12/2011 | Rutman |
| 2012/0035839 A1 | 2/2012 | Stehle |
| 2012/0041675 A1 | 2/2012 | Juliver |
| 2012/0065871 A1 | 3/2012 | Deshpande |
| 2012/0089326 A1 | 4/2012 | Bouve |
| 2012/0092187 A1 | 4/2012 | Scholl |
| 2012/0136561 A1 | 5/2012 | Barker |
| 2012/0291049 A1 | 11/2012 | Park |
| 2012/0303222 A1 | 11/2012 | Cooprider |
| 2012/0323438 A1 | 12/2012 | Wendel |
| 2013/0002477 A1 | 1/2013 | Dehnie |
| 2013/0006531 A1 | 1/2013 | Gee |
| 2013/0006925 A1 | 1/2013 | Sawai |
| 2013/0013203 A1 | 1/2013 | Sumizawa |
| 2013/0030699 A1 | 1/2013 | Barnes |
| 2013/0079964 A1 | 3/2013 | Sukkarie |
| 2013/0104231 A1 | 4/2013 | Niner |
| 2013/0141247 A1 | 6/2013 | Ricci |
| 2013/0179382 A1 | 7/2013 | Fritsch |
| 2013/0204524 A1 | 8/2013 | Fryer |
| 2013/0214939 A1 | 8/2013 | Washlow |
| 2013/0219039 A1 | 8/2013 | Ricci |
| 2013/0305357 A1 | 11/2013 | Ayyagari |
| 2013/0321397 A1 | 12/2013 | Chen |
| 2014/0032015 A1 | 1/2014 | Chun |
| 2014/0075004 A1 | 3/2014 | Van Dusen |
| 2014/0089243 A1 | 3/2014 | Oppenheimer |
| 2014/0089375 A1 | 3/2014 | Poornachandran |
| 2014/0104077 A1 | 4/2014 | Engel |
| 2014/0120953 A1 | 5/2014 | Ingram |
| 2014/0136099 A1 | 5/2014 | Choi |
| 2014/0191858 A1 | 7/2014 | Morgan |
| 2014/0195214 A1 | 7/2014 | Kozloski |
| 2014/0236414 A1 | 8/2014 | Droz |
| 2014/0248899 A1 | 9/2014 | Emadzadeh |
| 2014/0277918 A1 | 9/2014 | Kim |
| 2014/0278026 A1 | 9/2014 | Taylor |
| 2014/0278029 A1 | 9/2014 | Tonguz |
| 2014/0278074 A1 | 9/2014 | Annapureddy |
| 2014/0289267 A1 | 9/2014 | Felix |
| 2014/0306834 A1 | 10/2014 | Ricci |
| 2014/0365644 A1 | 12/2014 | Tanaka |
| 2015/0032418 A1 | 1/2015 | Akiyama |
| 2015/0051822 A1 | 2/2015 | Joglekar |
| 2015/0066284 A1 | 3/2015 | Yopp |
| 2015/0088835 A1 | 3/2015 | Davis |
| 2015/0112570 A1 | 4/2015 | Schmüdderich |
| 2015/0120083 A1 | 4/2015 | Gurovich |
| 2015/0127388 A1 | 5/2015 | Oldham |
| 2015/0149019 A1 | 5/2015 | Pilutti |
| 2015/0160023 A1 | 6/2015 | Goel |
| 2015/0179077 A1 | 6/2015 | Morgan |
| 2015/0226858 A1 | 8/2015 | Leibner |
| 2015/0227553 A1 | 8/2015 | Dobre |
| 2015/0266455 A1 | 9/2015 | Wilson |
| 2015/0279122 A1 | 10/2015 | Lorenzen |
| 2015/0279182 A1 | 10/2015 | Kanaujia |
| 2015/0333992 A1 | 11/2015 | Vasseur |
| 2015/0349917 A1 | 12/2015 | Skaaksrud |
| 2015/0360692 A1 | 12/2015 | Ferguson |
| 2015/0371352 A1 | 12/2015 | Boss |
| 2015/0375752 A1 | 12/2015 | Carlsson |
| 2016/0028632 A1 | 1/2016 | Vasseur |
| 2016/0042239 A1 | 2/2016 | Fowe |
| 2016/0061625 A1 | 3/2016 | Wang |
| 2016/0069695 A1 | 3/2016 | Broadbent |
| 2016/0076905 A1 | 3/2016 | Broadbent |
| 2016/0078756 A1 | 3/2016 | Basalamah |
| 2016/0092317 A1 | 3/2016 | Akiyama |
| 2016/0097649 A1 | 4/2016 | Broadbent |
| 2016/0112201 A1 | 4/2016 | Misawa |
| 2016/0119419 A1 | 4/2016 | Choi |
| 2016/0133130 A1 | 5/2016 | Grimm |
| 2016/0138930 A1 | 5/2016 | Akiyama |
| 2016/0189044 A1 | 6/2016 | Pan |
| 2016/0203651 A1 | 7/2016 | Heath |
| 2016/0210857 A1 | 7/2016 | Gao |
| 2016/0212229 A1 | 7/2016 | McGavran |
| 2016/0212601 A1 | 7/2016 | Braun |
| 2016/0245660 A1 | 8/2016 | Winckler |
| 2016/0334241 A1 | 11/2016 | Kesting |
| 2016/0351053 A1 | 12/2016 | Jung |
| 2016/0358479 A1 | 12/2016 | Riedelsheimer |
| 2016/0370185 A1 | 12/2016 | Gotoh |
| 2016/0370190 A1 | 12/2016 | Gotoh |
| 2016/0370195 A1 | 12/2016 | Gotoh |
| 2016/0370469 A1 | 12/2016 | Mabuchi |
| 2016/0371120 A1 | 12/2016 | Gotoh |
| 2016/0371281 A1 | 12/2016 | Gotoh |
| 2016/0371299 A1 | 12/2016 | Gotoh |
| 2016/0371323 A1 | 12/2016 | Gotoh |
| 2016/0371326 A1 | 12/2016 | Gotoh |
| 2016/0371864 A1 | 12/2016 | Gotoh |
| 2016/0371975 A1 | 12/2016 | Yamamoto |
| 2016/0371976 A1 | 12/2016 | Yamamoto |
| 2016/0373449 A1 | 12/2016 | Haga |
| 2016/0373896 A1 | 12/2016 | Yamamoto |
| 2017/0010111 A1 | 1/2017 | Gotoh |
| 2017/0010112 A1 | 1/2017 | Gotoh |
| 2017/0012812 A1 | 1/2017 | Gotoh |
| 2017/0026858 A1 | 1/2017 | McKee |
| 2017/0067764 A1 | 3/2017 | Skupin |
| 2017/0084175 A1 | 3/2017 | Sedlik |
| 2017/0178505 A1 | 6/2017 | Ishikawa |
| 2017/0213455 A1 | 7/2017 | Yamamoto |
| 2017/0228410 A1 | 8/2017 | Slusar |
| 2017/0278409 A1 | 9/2017 | Johnson |
| 2017/0352200 A1 | 12/2017 | Wang |
| 2018/0022328 A1 | 1/2018 | Tochigi |
| 2018/0053404 A1 | 2/2018 | Horita |
| 2018/0189913 A1 | 7/2018 | Knopp |
| 2018/0372855 A1 | 12/2018 | Akiyama |
| 2018/0372856 A1 | 12/2018 | Akiyama |
| 2018/0374343 A1 | 12/2018 | Akiyama |
| 2018/0374344 A1 | 12/2018 | Akiyama |
| 2018/0374353 A1 | 12/2018 | Hosokawa |
| 2018/0374354 A1 | 12/2018 | Akiyama |
| 2018/0374355 A1 | 12/2018 | Hosokawa |
| 2018/0374356 A1 | 12/2018 | Akiyama |
| 2018/0374357 A1 | 12/2018 | Hosokawa |
| 2018/0374358 A1 | 12/2018 | Akiyama |
| 2020/0066156 A1 | 2/2020 | Akiyama |

FOREIGN PATENT DOCUMENTS

| | | |
|---|---|---|
| CN | 102798854 A | 11/2012 |
| CN | 102997928 A | 3/2013 |
| CN | 103247176 A | 8/2013 |
| CN | 103258043 A | 8/2013 |
| CN | 103854072 A | 6/2014 |
| CN | 103971529 A | 8/2014 |
| CN | 104880722 A | 9/2015 |
| CN | 106228799 B | 5/2019 |
| DE | 10030819 A1 | 1/2002 |
| DE | 102005020154 A1 | 11/2006 |
| EP | 1914701 A2 | 4/2008 |
| JP | 11083511 A | 3/1999 |
| JP | 2001028004 A | 1/2001 |
| JP | 2003004468 A | 1/2003 |
| JP | 2007286706 A | 11/2007 |
| JP | 2008003829 A | 1/2008 |
| JP | 2008123325 A | 5/2008 |
| JP | 2008262418 A | 10/2008 |
| JP | 2008294921 A | 12/2008 |
| JP | 2009277078 A | 11/2009 |
| JP | 1985119 B2 | 7/2012 |
| JP | 2012155286 A | 8/2012 |

(56) References Cited

FOREIGN PATENT DOCUMENTS

| | | | |
|---|---|---|---|
| JP | 2012207919 A | 10/2012 |
| JP | 2012233800 A | 11/2012 |
| JP | 2013045242 A | 3/2013 |
| JP | 2014065362 A | 4/2014 |
| JP | 2014075008 A | 4/2014 |
| JP | 2014095663 A | 5/2014 |
| JP | 2015018396 A | 1/2015 |
| JP | 2015081057 A | 4/2015 |
| KR | 101354607 B1 | 1/2014 |
| WO | 2007140527 A1 | 12/2007 |
| WO | 2011081157 A1 | 7/2011 |
| WO | 2013167085 A2 | 11/2013 |
| WO | 2016203385 A1 | 12/2016 |

OTHER PUBLICATIONS

Abrougui et al., "Efficient load balancing and QoS-based location aware service discovery protocol for vehicular ad hoc networks," EURASIP Journal on Wireless Communications and Networking, Mar. 2012, p. 1-15, Springer.

Aulinas et al., "Local map update for large scale SLAM," Electronics Letters, Apr. 15, 2010, p. 1-2, vol. 46, No. 8.

Carson et al., "GPS Spoofing Detection and Mitigation Using Cooperative Adaptive Cruise Control System," IEEE Intelligent Vehicles Symposium (IV), Jun. 19-22, 2016, p. 1091-1096, Gothenburg, Sweden.

Dangel et al., "Can Road Traffic Volume Information Improve Partitioning for Distributed SUMO?," Modeling Mobility with Open Data, Lecture Notes in Mobility, 2015, p. 61-74, Springer International Publishing.

Dictionary.com, "pertain", 2018, p. 1.

DRM, "Local Dynamic Map," DRM Research Seminar, Jun. 30, 2010., p. 1-72, Japan Digital Road Map Association.

Furuichi et al., "Information Sharing Among Mobile Apparatus," Application and Drawings, Filed on Jan. 24, 2017, 53 pages, U.S. Appl. No. 15/413,560.

Gotoh et al., "Geographic Space Management," Application and Drawing, Filed on Mar. 2, 2017, 93 Pages, U.S. Appl. No. 15/447,594.

Gotoh et al., "Management of Mobile Objects," Application and Drawing, Filed on Dec. 16, 2015, 65 Pages, U.S. Appl. No. 14/970,631.

He et al., "Sharing Trajectories of Autonomous Driving Vehicles to Achieve Time-Efficient Path Navigation," IEEE Vehicular Networking Conference, 2013, p. 119-126.

Hong et al., "A grid-based node split algorithm for managing current location data of moving objects," The Journal of Supercomputing, Dec. 2007, p. 321-337, vol. 42, Issue 3, Springer.

Hsu et al., "Automatic Traffic Monitoring Method Based on Cellular Model," Fifth International Conference on Intelligent Information Hiding and Multimedia Signal Processing, 2009, p. 640-643, IEEE Computer Society.

IEEE, "Server—Definition," IEEE 100: The Authoritative Dictionary of IEEE Standards Terms, 2000, p. 1031, Seventh Edition.

IEEE, "System—Definition," IEEE 100: The Authoritative Dictionary of IEEE Standards Terms, 2000, p. 1143-1144, Seventh Edition.

Ihm et al., "Advanced Spatial Data Management for Enterprise Applications," An Oracle White Paper, Aug. 2010, p. 1-16, Oracle Spatial 11g.

International Searching Authority, "Notification of Transmittal of the International Search Report and the Written Opinion of the International Searching Authority, or the Declaration," Patent Cooperation Treaty, dated Sep. 21, 2016, 11 Pages, International Application No. PCT/IB2016/053523.

International Searching Authority, "Notification of Transmittal of the International Search Report and the Written Opinion of the International Searching Authority, or the Declaration," Patent Cooperation Treaty, dated Oct. 17, 2018, 31 Pages, International Application No. PCT/IB2018/0054408.

International Searching Authority, "Notification of Transmittal of the International Search Report and the Written Opinion of the International Searching Authority, or the Declaration," Patent Cooperation Treaty, dated Oct. 17, 2018, 9 Pages, International Application No. PCT/IB2018/0054409.

Ishikawa et al., "Management of Mobile Objects and Resources," Application and Drawings, Filed on Mar. 1, 2017, 56 Pages, U.S. Appl. No. 15/446,359.

Ishikawa et al., "Management of Mobile Objects and Resources," Application and Drawings, Filed on Dec. 16, 2015, 52 Pages, U.S. Appl. No. 15/970,626.

Ishikawa et al., "Management of Mobile Objects," Application and Drawings, Filed on Dec. 16, 2015, 78 Pages, U.S. Appl. No. 15/970,643.

Kattan et al., "Time-Series Event-Based Prediction: An Unsupervised Learning Framework Based on Genetic Programming," Information Sciences, Aug. 17, 2014, p. 1-38.

Liao et al., "Anomaly Detection in GPS Data Based on Visual Analytics," IEEE Symposium on Visual Analytics Science and Technology, Oct. 24-29, 2010, p. 51-58, Salt Lake City, Utah, USA.

Merriam-Webster, "placeholder", Merriam-Webster Dictionary, 2017, 1 Page.

Microsoft Computer Dictionary, "Object" 5th Edition, 2002, p. 372.

Microsoft Computer Dictionary, 5th Edition, 2002, p. 228, "function".

Microsoft, "select," Microsoft Computer Dictionary, 2002, p. 471, 2nd Edition.

Miyahira et al., "Management of Mobile Objects and Service Platform for Mobile Objects," Application and Drawings, Filed on Jul. 14, 2016, 68 Pages, U.S. Appl. No. 15/210,178.

Miyahira et al., "Management of Mobile Objects and Service Platform for Mobile Objects," Application and Drawings, Filed on Jul. 14, 2016, 68 Pages, U.S. Appl. No. 15/210,207.

Narayanan et al., "Using Data Analytics to Detect Anomalous States in Vehicles," arXiv AI: Artificial Intelligence, Dec. 25, 2015, p. 1-10, arXiv:1512.08048 [cs.AI], Cornell University Library.

Nishimura et al., "Management of Dynamic Events and Moving Objects," Application and Drawings, Filed on Sep. 1, 2016, 91 Pages, U.S. Appl. No. 15/254,183.

Openstreetmap, "QuadTiles," OpenStreetMap Wiki, Last Modified on Mar. 3, 2014, p. 1-10, http://wiki.openstreetmap.org/wiki/QuadTiles, Accessed on Jun. 15, 2015.

Ortelli, "Server-side clustering of geo-points on a map using Elasticsearch," Trifork Blog, Aug. 1, 2013, p. 1-14, http://blog.trifork.com/2013/08/01/server-side-clustering-of-geo-points-on-a-map-using-elasticsearch/, Accessed on Jun. 15, 2015.

Pawlowski et al., "Applying Event Stream Processing on Traffic Problem Detection," Progress in Artificial Intelligence (EPAI), 2009, p. 27-38, LNAI vol. 5816, Springer-Verlag Berlin Heidelberg.

Pending U.S. Appl. No. 15/855,159, filed Dec. 27, 2017, entitled: "Management of Mobile Objects", pp. 1-69.

Pending U.S. Appl. No. 15/855,238, filed Dec. 27, 2017, entitled: "Management of Mobile Objects", pp. 1-71.

Pending U.S. Appl. No. 15/855,408, filed Dec. 27, 2017, entitled: "Management of Mobile Objects", pp. 1-68.

Pending U.S. Appl. No. 15/903,084, filed Feb. 23, 2018, entitled: "Management of Mobile Objects", pp. 1-69.

Radin, "GPS Spoofing Detection Using Multiple Antennas and Individual Space Vehicle Pseudoranges," Open Access Master's Theses, 2015, p. 1-99, Paper 528, DigitalCommons@University of Rhode Island.

Schade, "Sharing Data by Means of a Local Dynamic Map," Understanding the Standards for Cooperative ITS, Feb. 6, 2014, p. 1-10, Mines ParisTech, Transportation Sustainability Environment Consulting.

Sun et al., "Moving Object Map Analytics: A Framework Enabling Contextual Spatial-Temporal Analytics of Internet of Things Applications," IEEE International Conference on Service Operations and Logistics, and Informatics (SOLI), 2016, p. 101-106.

Suzumura et al., "X10-based Massive Parallel Large-Scale Traffic Flow Simulation," ProVISION, Winter 2012, p. 74-79, No. 72, IBM Professionals' Papers.

(56) References Cited

OTHER PUBLICATIONS

U.S. Appl. No. 15/483,415, entitled "Management of Moving Objects", filed Apr. 10, 2017, 59 Pages.
U.S. Appl. No. 15/628,762, entitled "Management of Mobile Objects", filed Jun. 21, 2017, 69 Pages.
U.S. Appl. No. 15/628,787, entitled "Management of Mobile Objects", filed Jun. 21, 2017, 69 Pages.
U.S. Appl. No. 15/628,797, entitled "Management of Mobile Objects", filed Jun. 21, 2017, 72 Pages.
U.S. Appl. No. 15/628,815, entitled "Management of Mobile Objects", filed Jun. 21, 2017, 74 Pages.
U.S. Appl. No. 15/628,828, entitled "Management of Mobile Objects", filed Jun. 21, 2017, 71 Pages.
Y et al., "A Complex Event Processing System Approach to Real Time Road Traffic Event Detection," Journal of Convergence Information Technology (JCIT), Oct. 2013, p. 142-148, vol. 8, No. 15.
Yamamoto, "Management of Moving Objects," Application and Drawings, Filed on Apr. 10, 2017, 59 Pages, U.S. Appl. No. 15/483,415.
IBM: List of IBM Patents or Patent Applications Treated as Related (Appendix P), Jan. 13, 2020, 2 pages.
Pending U.S. Appl. No. 16/674,783, entitled "Management of Mobile Objects", filed Nov. 5, 2019, 67 Pages.

* cited by examiner

| Edge ID | Event ID | Location | Event Content | Influence Event |
|---|---|---|---|---|
| Edge 0001 | Eve 0214 | Full Length | Speed Limited to 30km/h | Eve 0114(Edge 0002) |
| Edge 0002 | Eve 0114 | 32m from the 1st node | Closure | Eve 0214(Edge 0001), Eve 0421(Edge 0003)... |
| ⋮ | ⋮ | ⋮ | ⋮ | ⋮ |
| Edge 1000 | N/A | - | - | Eve 1201 (edge xxxx) |

Event List

FIG.9

| Edge ID | Counts | Location | Event Content |
|---|---|---|---|
| Edge 0009 | 2 | Full length | Congestion |
| Edge 0013 | 1 | 15m from the $2^{nd}$ node | Skid |
| ... | ... | ... | |

Candidate Event List

FIG.10

| Edge ID | Event ID | Location | Event Content |
|---------|----------|----------|---------------|
| Edge 0001 | Eve 0214 | Full Length | Speed Limited to 30km/h |
| Edge 0002 | Eve 0114 | 32m from the 1st node | Closure |

Notification Event List

FIG.11

MANAGEMENT OF MOBILE OBJECTS

BACKGROUND

The present invention relates to management of the movement of mobile objects.

Driving support and automobile systems receive information by communicating with a plurality of automobiles, acquire event information concerning accidents or obstructions on the road and map this information onto a map along with the position of an automobile. Such systems reference automobile position information, automobile characteristic information, driver characteristic information, and the like, and transmits suitable event information to each automobile.

SUMMARY

An embodiment of the invention may include a method, computer program product and computer system for managing mobile objects. The embodiment may identify, by an event agent (EA), an event occurring in a geographic space in which a plurality of mobile objects move. The embodiment may include determining the event is an expected event based on predicting time-series changes of the event handled by the EA. The embodiment may manage the one mobile object based on the expected event.

BRIEF DESCRIPTION OF THE DRAWINGS

FIG. 9 shows an illustrative example of an event list.

FIG. 10 shows an illustrative example of a candidate event list.

FIG. 11 shows an illustrative example of a notification event list.

DETAILED DESCRIPTION

Embodiments of the present invention will now be described in detail with reference to the accompanying Figures.

Hereinafter, example embodiments of the present invention will be described. The example embodiments shall not limit the invention according to the claims, and the combinations of the features described in the embodiments are not necessarily essential to the invention.

Figure 1:
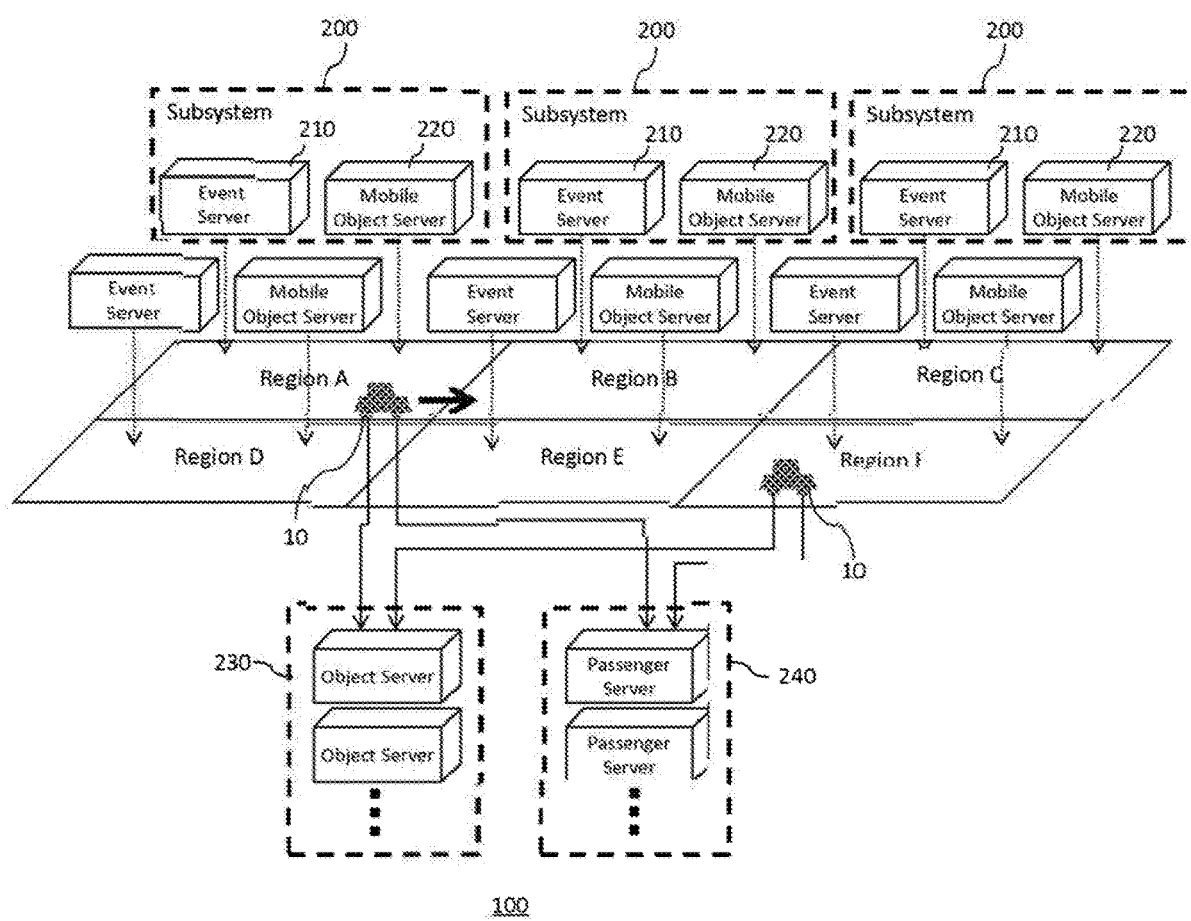
FIG. 1 shows a system 100 according to an embodiment of the present invention and a map area corresponding to a geographic space managed by the system 100.

FIG. 1 shows a system 100 and a map area corresponding to a geographic space managed by the system 100, according to an embodiment of the present invention. The system 100 manages a geographic space that includes routes on which a mobile object 10 moves. The system 100 is operable to divide the geographic space into a plurality of regions and manage these regions. A mobile object 10 may move on routes including land routes, sea routes, and/or air routes, for example. The geographic space may be land, sea, or air space that includes the routes on which the mobile object travels. The mobile objects 10 may be manned/unmanned automobiles, motorbikes, bicycles, humans having a digital device, airplanes, vessels, drones, or the like.

FIG. 1 shows an automobile as an example of the mobile object 10, which moves along roads as examples of land routes. The system 100 includes a plurality of subsystems 200 that respectively manage the plurality of regions. FIG. 1 shows an example in which the map area is divided into six regions from region A to region F, and six subsystems 200 respectively manage these six regions.

System 100 comprises a plurality of event servers 210, a plurality of mobile object servers 220, a plurality of object servers 230, and a plurality of passenger servers 240. According to the embodiment of FIG. 1, each of the subsystems 200 may include at least one of the plurality of event servers 210 and one of the plurality of mobile object servers 220.

The event server 210 manages events occurring in each region of the geographic space. In one embodiment, the event server 210 of subsystem 200 assigned to region A may manage events in region A. The plurality of mobile object servers 220 respectively assigned to a plurality of regions in a geographic space manage the mobile objects 10 in each of the plurality of regions. In one embodiment, the mobile object server 220 assigned to region A may manages mobile objects 10 located in region A. The object server 230 manages information of the mobile objects 10 regardless of the location of the mobile objects 10. The passenger server 240 manages information of at least one passenger riding on the mobile objects 10.

Each of the subsystems 200 may be implemented on one or more servers. In one embodiment, each event server 210 and mobile object server 220 may be implemented on one server. In one embodiment, a set of an event server 210 and a mobile object server 220 in a subsystem 200 may be implemented by one server. Portions of the system 100 other than the subsystems 200 may also be implemented on one or more servers. In one embodiment, each object server 230 and passenger server 240 may be implemented on one server. In another embodiment, a set of object servers 230 and a set of passenger servers 240 may be each implemented by one server. In yet another embodiment, all of the object servers 230 and the passenger servers 240 may be implemented on one server. These servers may exist at any point on a network including the Internet, a subscriber network, a cellular network, or a desired combination of networks. The servers may be computers or other types of data processors, and may be dedicated servers, or may be shared servers that perform other operations.

The system 100 acquires the positions of a mobile object 10 from the mobile object 10, and the mobile object server 220 managing the region that includes the acquired position of the mobile object 10 may manage the movement of this mobile object 10. The system 100 acquires information of events that have occurred to the mobile object 10 and/or on the road outside, and the event server 210 managing the region including the position where such an event has occurred may manage the state of the event.

This event may include information about accidents, obstructions, closure, limitation, status, or construction on the road, or information about the weather, temperature, buildings, shops, or parking lots near the road. In response to a setting or a request from the mobile object 10, the subsystem 200 may provide notification about the event information to the mobile object 10 that made the request. For example, if the mobile object 10 is moving on a route in a geographical area corresponding to region A, then the mobile object server 220 managing region A provides this mobile object 10 with the notification about the event relating to the route.

Since the map area is divided into a plurality of regions, despite the mobile object 10 simply moving on a route, the region corresponding to the position of the mobile object 10 might change. FIG. 1 shows an example in which the mobile object 10 is driving on a road such that the position of the mobile object 10 moves from region A to region B on the regions. In this case, according to the movement of the mobile object 10, the system 100 may transfer the information concerning the mobile object 10 from the mobile object server 220 managing region A to the mobile object server 220 managing region B, and may also transfer the management of the mobile object 10 to the mobile object server 220 managing region B.

Figure 2:
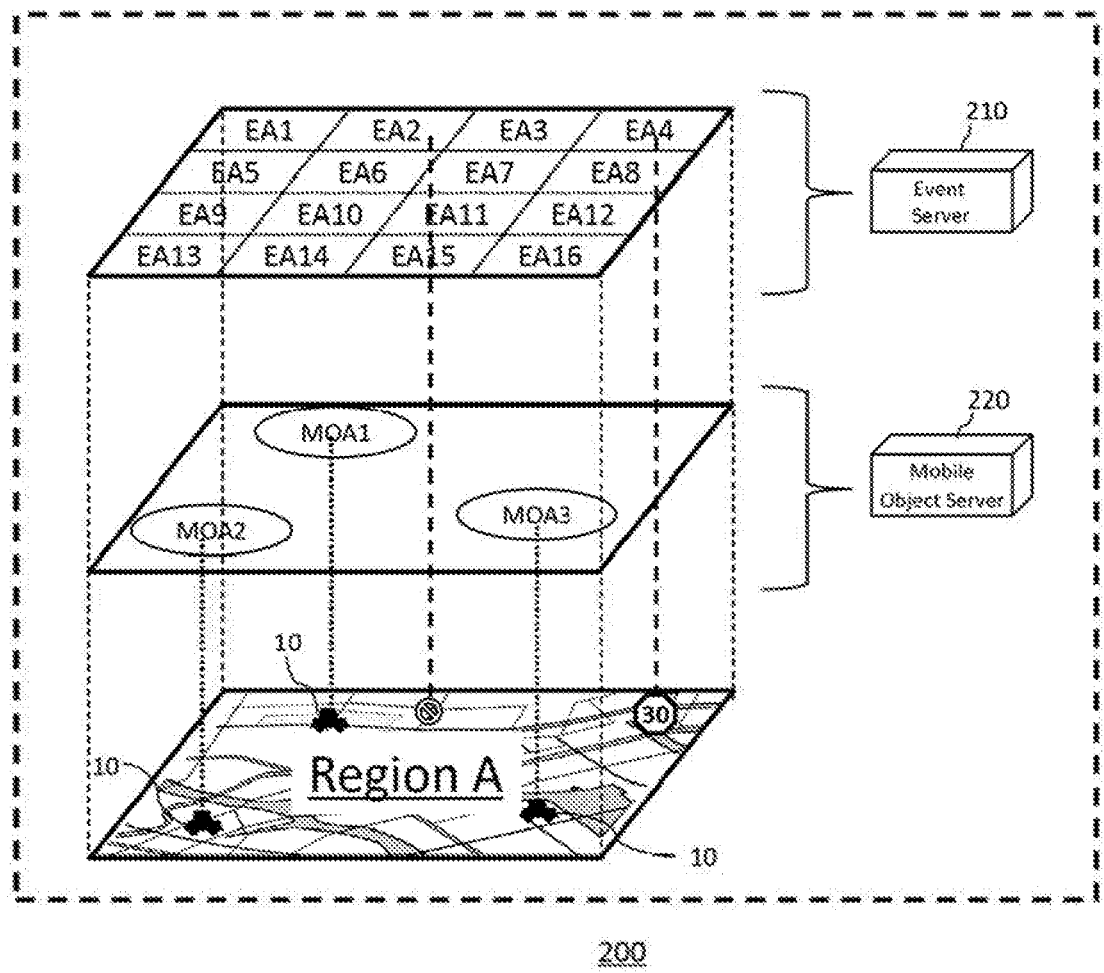
FIG. 2 shows a subsystem 200 according to the embodiment of the present invention and a map area corresponding to a region A managed by the subsystem 200.

FIG. 2 shows a subsystem 200 and a map area corresponding to a region A managed by the subsystem 200, according to an embodiment of the present invention. The event server 210 manages at least one event agent, and executes each event agent to manage events on routes in a region assigned to the event server 210. An "agent" may be a software entity having specific data, and may operable to receive a message (e.g. command), and return a result of the message. Each region of the plurality of regions of geographic space includes at least a portion of one area of the plurality of areas. In this embodiment, the region assigned to the event server 210 is the same as the region assigned to the mobile object server 220. However, in other embodiments, these regions may be different.

In the embodiment of FIG. 2, the region A, which is the region assigned to the event server 210, is divided into 16 areas and 16 areas are assigned to each of the event agents EA1-EA16. The event server 210 executes each of the event agents EA1-EA16 to manage events occurring on routes of each area of region A. For example, the event agent EA2 may manage a "closure" event on an area corresponding to EA2 on the map, and the event agent EA4 may manage a "speed limit" event on an area corresponding to EA4 as shown in FIG. 2.

The plurality of mobile object servers 220 may include at least one mobile object server 220 including one or more mobile object agents, each of which is assigned to each of the mobile objects 10. In the embodiment of FIG. 2, the mobile object server 220 includes three mobile object agents MOAs 1-3 assigned to three mobile objects 10 in the assigned region A. The mobile object server 220 executes each of the mobile object agents MOA1-MOA3 to manage the mobile objects 10 traveling on the region A.

Figure 3:
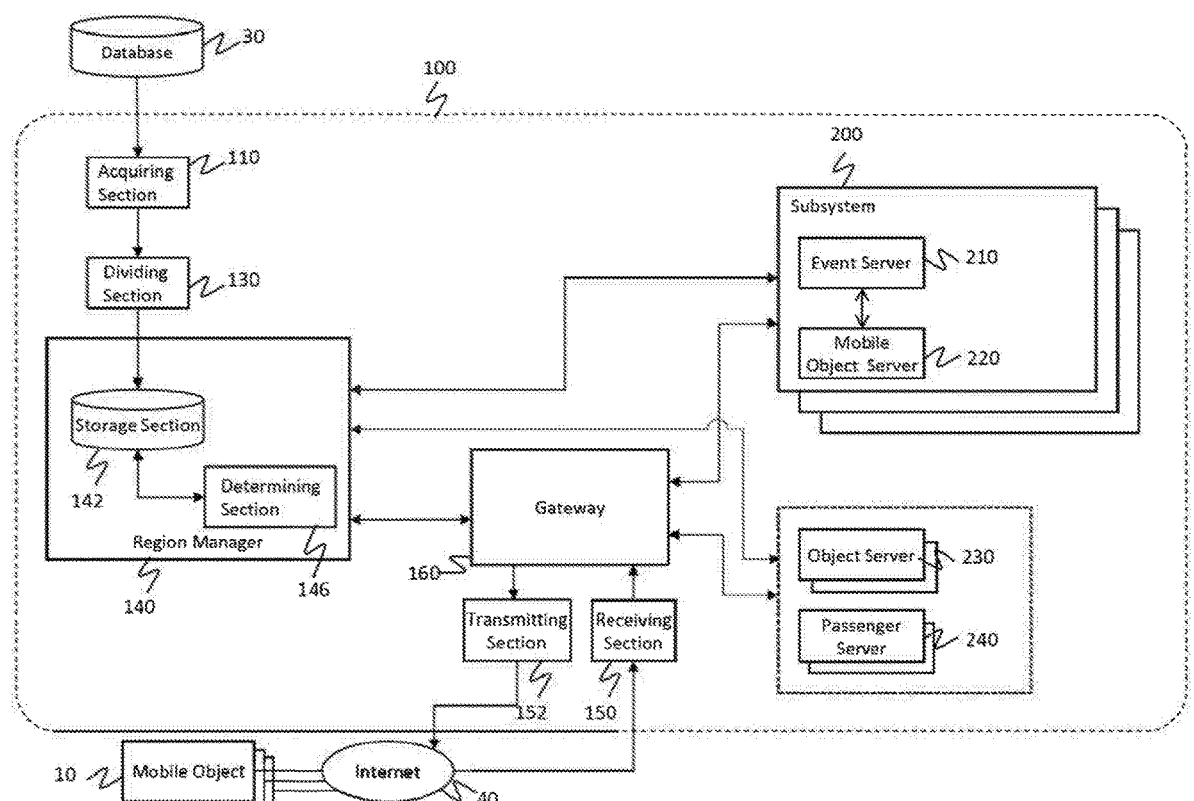
FIG. 3 shows a first exemplary configuration of the system 100 according to the present embodiment.

FIG. 3 shows an exemplary configuration of the system 100, according to an embodiment of the present invention. The system 100 may be operable to communicate with each of a plurality of mobile objects 10 to send and receive the information used to manage the mobile objects 10. The system 100 may be operable to acquire map data and/or information exchanged with the mobile objects 10, through the Internet, a subscriber network, a cellular network, or any desired combination of networks. The system 100 includes an acquiring section 110, a dividing section 130, a region manager 140, a receiving section 150, a transmitting section 152, a gateway apparatus 160, a plurality of subsystems 200, a plurality of object servers 230, and a plurality of passenger servers 240.

The acquiring section 110 may be operable to acquire map data corresponding to the geographical areas where a mobile object 10 is positioned, from an external database 30, for example. In response to the map being updated, the acquiring section 110 may acquire some or all of the updated map data. The acquiring section 110 may be operable to acquire the map data from the Internet, a subscriber network, a cellular network, or any desired combination of networks. The system 100 may be operable to store the map data in advance.

The acquiring section 110 may further acquire an event that has occurred within the geographic space to be managed by the system 100. In this case, the acquiring section 110 may acquire, accident information, traffic information, weather information, time information, etc.

The dividing section 130 may be operable to communicate with the acquiring section 110 and divide the map area into a plurality of regions. In this embodiment, the dividing section 130 generates two groups of regions by dividing an original map area into a plurality of regions.

The region manager 140 may be operable to store information concerning the plurality of regions including the regions resulting from the division. The region manager 140 may be operable to specify the subsystem 200 managing the region that includes the position of the mobile object 10, in response to receiving the position of the mobile object 10. The region manager 140 may be implemented on one or more servers. The region manager 140 includes a storage section 142 and a determining section 146.

The storage section 142 may be operable to communicate with the dividing section 130 and store information concerning the plurality of first regions and the plurality of second regions resulting from the division by the dividing section 130. The storage section 142 may store setting values or the like of the system 100.

The storage section 142 may store intermediate data, calculation results, threshold values, parameters, and the like that are generated by or used in the operations of the system 100. In response to a request from any component within the system 100, the storage section 142 may supply the data stored therein to the component making the request. The storage section 142 may be a computer readable storage medium such as an electric storage device, a magnetic storage device, an optical storage device, an electromagnetic storage device, or a semiconductor storage device.

The determining section 146 may be operable to communicate with the storage section 142, and determine one region from the plurality of regions (e.g., regions A-F of FIG. 1) in which each of the mobile objects 10 is located based on the position information of the mobile object 10 and geographic information of the plurality of regions. The determining section 146 may identify a route or position in the map area managed by the system 100 that corresponds to the position information of the mobile object 10.

The determining section 146 may store the position information of this mobile object 10 and/or information of the determined region in the storage section 142, in association with this mobile object 10. The determining section 146 may store a history of the position information of this mobile object 10 and/or a history of the determined mobile object server 220 in the storage section 142. The determining section 146 may be a circuit, a shared or dedicated computer readable medium storing computer readable program instructions executable by a shared or dedicated processor, etc.

The receiving section 150 may be operable to receive information transmitted from each of a plurality of mobile objects 10. Each mobile object 10 may transmit information at designated time intervals, and the receiving section 150 may sequentially receive this transmitted information. In this embodiment, the receiving section 150 may receive car probe data from each mobile object 10 as the information. The car probe data may include information detected by the mobile object 10, such as position information of the mobile object 10.

In one embodiment, the position information may include longitude and latitude (and optionally altitude information) of the mobile object 10 in an absolute coordinate system. In another embodiment, the mobile object 10 may determine its location in the absolute coordinate system by using GPS, and the determining section 146 receiving the position information may determine a route on which the mobile object 10 exists and a specific location of the route at which the mobile object 10 exists based on the position information. Alternatively, the mobile object 10 may include such detailed position information in the car probe data.

The receiving section 150 may communicate with the plurality of mobile objects 10 and receive the car probe data of each mobile object 10, via the Internet 40. The receiving section 150 may receive the car probe data of the plurality of mobile objects 10 through wireless communication, a subscriber network, a cellular network, or any desired combination of networks.

The transmitting section 152 may be operable to transmit event information to each of the mobile objects 10 according to settings, for example. The transmitting section 152 may transmit information concerning the route on which the mobile object 10 is expected to travel. The transmitting section 152 may communicate with the mobile objects 10 and transmit each type of information to the mobile objects 10 via the Internet 40. The transmitting section 152 may transmit each type of information to the mobile objects 10 through wireless communication, a subscriber network, a cellular network, or any desired combination of networks.

The gateway apparatus 160 may be operable to transfer communication between the plurality of subsystems 200 and the plurality of mobile objects 10. The gateway apparatus 160 may communicate with the receiving section 150 and receive the information transmitted by each mobile object 10.

The gateway apparatus 160 may communicate with the region manager 140 and demand the transfer destination for each piece of information received from the mobile objects 10, of the region manager 140. In response to this request, the gateway apparatus 160 may receive from the region manager 140 the information of the subsystem 200 managing the region on which the mobile object 10 exists. The gateway apparatus 160 may transfer the information received from the mobile object 10 to the subsystem 200 that is to manage the mobile object 10. In other words, the gateway apparatus 160 may transfer the information received from each mobile object 10 to the subsystem 200 determined by the region manager 140.

The gateway apparatus 160 may communicate with each of the subsystems 200, and receive the information transmitted by each subsystem 200. The gateway apparatus 160 may communicate with the transmitting section 152 and supply the transmitting section 152 with the information received from each subsystem 200, such that this information is transferred to the mobile objects 10 designated for each subsystem 200.

The gateway apparatus 160 may include a plurality of gateway devices, and may quickly perform transfer between the plurality of subsystems 200 and the plurality of mobile objects 10. In this case, the receiving section 150 may function as a load balancer that supplies the information from the mobile objects 10, such that the load is spread among the plurality of gateways. The load balancer may sequentially supply information from the mobile objects 10 to the gateways having lighter loads. The gateway apparatus 160 may be a network that provides a connection between a plurality of networks using the same or different types of protocols.

A plurality of subsystems 200 may be operable to communicate with the region manager 140 and the gateway apparatus 160 and to respectively manage a plurality of regions in a geographic space. Each subsystem 200 is operable to manage mobile objects 10 that travel routes in its managing region and to manage events on its managing region.

As described, each subsystem 200 may include the event server 210 and the mobile object server 220. The event server 210 manages events occurring on its managing region with the plurality of the event agents. In one embodiment, the event server 210 may perform, through the event agent, (i) registration, update and/or deletion of events, (ii) registration, update and/or deletion of candidate events, and (iii) provision of event information.

The mobile object server 220 manages the plurality of the mobile objects 10 traveling on its managing region with the plurality of the mobile object agents. In one embodiment, the mobile object server 220 may perform, through the mobile object agent, (i) processing of the car probe data, (ii) update of information of the mobile object, and (iii) provision of information to the mobile object. For example, the mobile object server 220 may execute the mobile object agent to collect information of events from at least one event server 210, and provide the mobile object 10 with information that assists the mobile object 10 with traveling in the geographic space.

A plurality of object servers 230 including at least one object server 230 may communicate with the gate way 160 and include an object agent (OA) containing information of the mobile object 10. An object agent may correspond to each mobile object 10 and contain information thereof. In one embodiment, the object agent may contain (i) information, by region, of which subsystem currently manages a mobile object agent of the mobile object 10, (ii) an identification (ID) of the mobile object 10, (iii) an ID of a passenger of the mobile object 10, and (iv) a characteristic of the mobile object 10 (e.g., model/version information, width, length, and/or height of the mobile object 10).

The object server 230 may perform, through the object agent, (i) provision and/or update of information of the mobile object 10, (ii) registration, update, and/or deletion of the ID of passenger riding on the mobile object 10, (iii) provision and/or update of the information of the region of the mobile object 10, and (iv) provision of information needed for generation of a new mobile object agent by the mobile object server 220.

At least one passenger server 240 of a plurality of passenger servers may communicate with the gateway 160, and include a passenger agent that contains information of at least one passenger. A passenger agent may correspond to each passenger or candidate passenger of mobile objects 10, and contain information thereof. In one embodiment, the object agent may contain an ID of a passenger and a characteristic of the passenger (e.g., information of age, gender, type, and the like of license of the passenger). The passenger server 240 may perform, through the passenger agent, provision and/or update of information of the passengers.

As described above, the system 100 of the present embodiment may manage the mobile objects by utilizing the mobile object agents in each mobile object server 220, and manage the events by utilizing the event agent in each event server 210. According to the system 100 of the embodiment, the system 100 can separately manage information relating to the mobile objects 10 and events on the geographic map with a plurality of kinds of servers. Furthermore, the plurality of mobile object servers 220 can smoothly transfer the management of the mobile objects 10 traveling across the regions via the mobile object agents, thereby improving the efficiency of the whole system 100. In addition, according to the system 100 of the embodiment, each event server 210 divides event management in one region among the plurality of event agents and provides the mobile object agent with event information, thereby improving the efficiency of event management in the region (e.g., improving response time of event search) and thus event notification to the mobile objects 10. In addition, the system 100 can provide the mobile object agent with information of mobile object 10 by the object agent of the object server 230. The system 100 can also provide the mobile object agent with information of passengers of the mobile objects 10 by the passenger agent of the passenger server 240.

Figure 4:
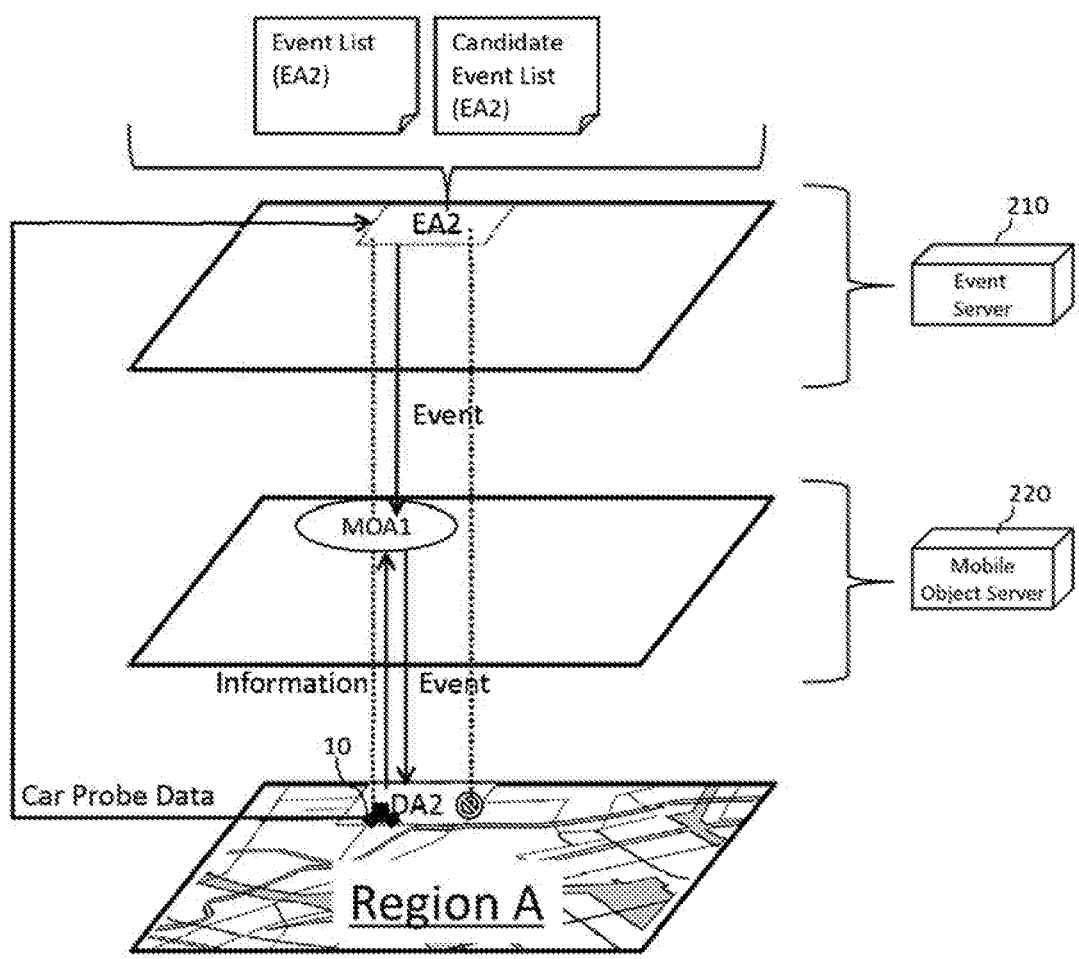
FIG. 4 shows management of events by the event server 210 and the mobile object server 220 according to one embodiment.

FIG. 4 shows management of events by the event server 210 and the mobile object server 220, according to an embodiment of the present invention. In this embodiment, a mobile object 10 is traveling on a target route on region A and transmitting a car probe data including the position information to the event server 210 managing region A with the car probe data via a gateway apparatus, such as the gateway apparatus 160. The event server 210 manages event information through each event agent based on the car probe data from the mobile objects on region A. For example, each event agent may manage an event list (containing information of an event and an influence event for routes on the area managed by the event agent) and a candidate event list (containing information of candidates of an event for routes on the area managed by the event agent).

In the embodiment of FIG. 4, the event agent EA2 manages events of an area (indicated as "DA2" on the region A of FIG. 4) by the event list of the event agent EA2 and the candidate event list of the event agent EA2 based on car probe data from the mobile object 10 on the area DA2. For example, the event agent EA2 assigned to the area DA2 is executable to generate an event based on the information from the mobile object 10.

In one embodiment, each mobile object server 220 is operable to receive information from the mobile object 10 in the region A assigned to the mobile object server 220. The mobile object server 220 determines the target route where the mobile object 10 is located. The mobile object server 220 sends the information to one event server 210 assigned to a region A where the mobile object 10 is located, and thereby requests the event agent EA2 assigned to the area DA2 where the target route is located to send an event list containing information of an event on the target route and the influence event of the target route.

The mobile object server 220 executes the mobile object agent MOA1 for the mobile object 10 to provide the mobile object 10 with information that assists the mobile object 10 with traveling in the area DA2 based on the information of the event on the other route and the influence event of the target route. In the embodiment of FIG. 4, the mobile object agent MOA1 receives, from the event agent EA2, the event information of the route on which the mobile object 10 exists, and provides the mobile object 10 with the event information (e.g., information of closure).

Figure 5:
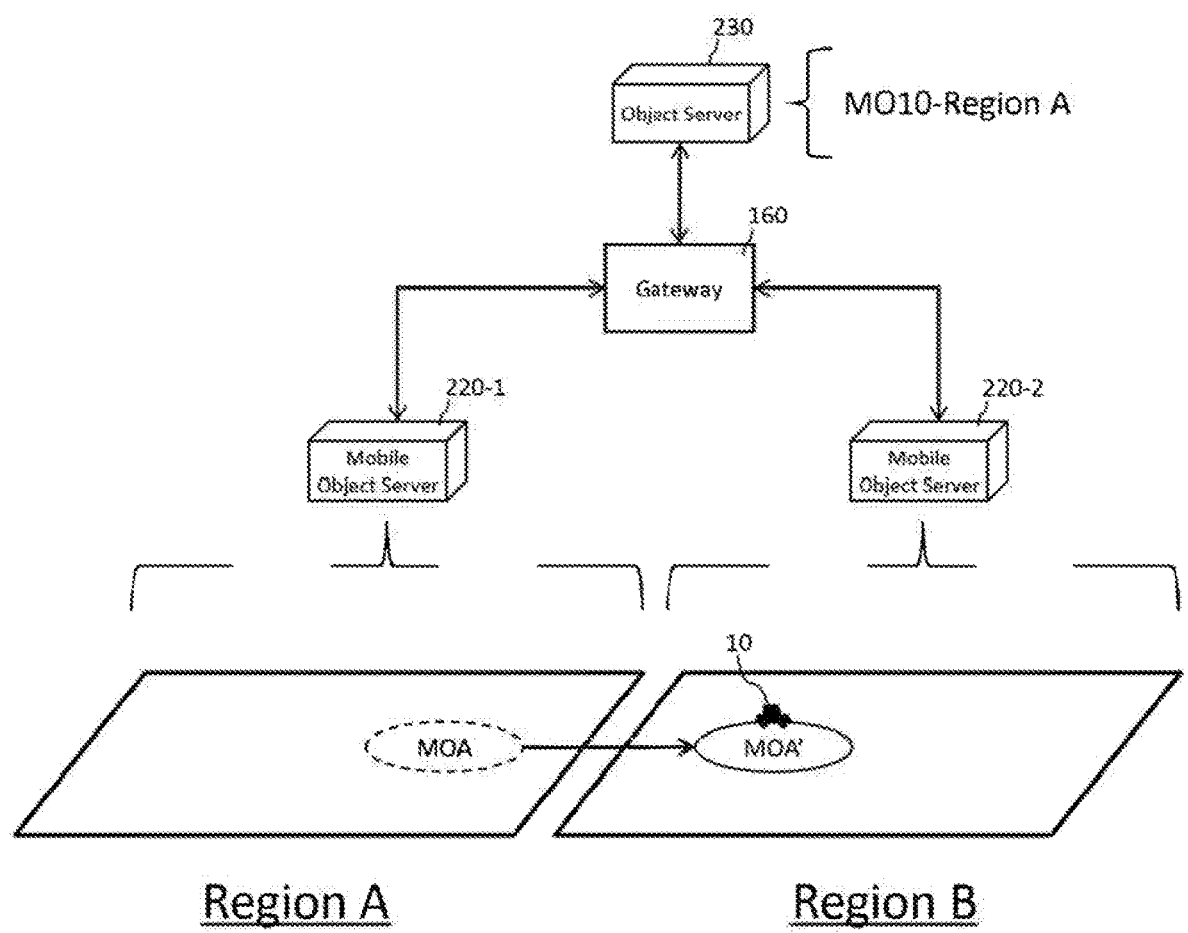
FIG. 5 shows management of mobile object by the mobile object server 220 and object server 230 according to one embodiment.

FIG. 5 shows management of a mobile object 10 by the mobile object servers 220 and object server 230, according to an embodiment of the present invention. The mobile object server 220-1 may transfer the mobile object agent via the gateway 160 to the mobile object server 220-2 assigned to a neighboring region in response to the mobile object 10 moving to the neighboring region. In this embodiment, in response to a mobile object 10 traveling from region A to region B, the mobile object server 220-1 managing region A deletes the mobile object agent MOA for the mobile object 10, and a mobile object server 220-2 managing region B generates a mobile object agent MOA for the mobile object 10.

In this embodiment, the object server 230 may store information that includes a mobile object server identifier MOS-ID that identifies one of the plurality of mobile object servers 220 executing the mobile object agent corresponding to the object agent 10. Just after the mobile object 10 arrives at region B, the mobile object server 220-2 has not been executing the mobile object agent for the mobile object 10. The mobile object server 220-2 is operable to receive information from the mobile object 10 in the region B assigned to the mobile object server 220-2.

Using the information from the mobile object 10, the mobile object server 220-2 obtains the mobile object server identifier MOS-ID from the object server 230 that manages the object agent for the mobile object 10 because the mobile object server 220-2 is not executing the mobile object agent for the mobile object 10. The mobile object server 220-2 requests a mobile object server 220-1 identified by the mobile object server identifier MOS-ID to transfer the mobile object agent for the mobile object 10. Then the mobile object server 220-1 managing region A transfers the mobile object agent to the mobile object server 220-2 assigned to a neighboring region B in response to the request.

Figure 6:
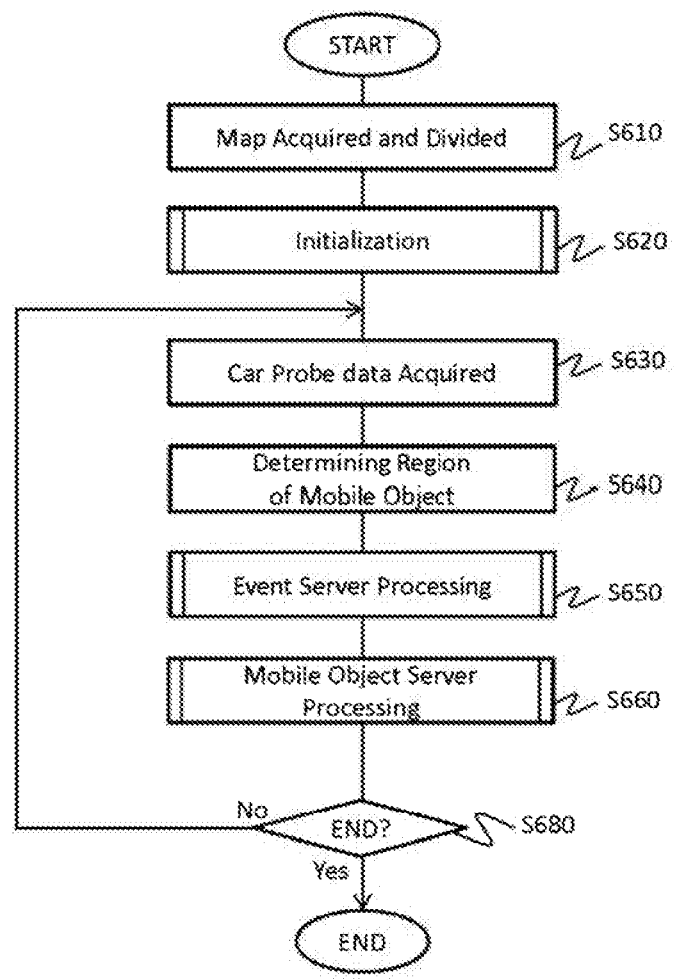
FIG. 6 shows an operational flow of an exemplary configuration of the system 100 according to the present embodiment.

FIG. 6 shows an operational flow of a system, according to an embodiment of the present invention. The present embodiment describes an example in which the system 100 performs the operations from S610 to S680 shown in FIG. 6 to manage mobile objects, such as mobile object 10, and events on a map area. FIG. 6 shows one example of the operational flow of the system 100 shown in FIGS. 1-5, but the system 100 shown in FIGS. 1-5 is not limited to using this operational flow explained below. Also, the operational flow in FIG. 6 may be performed by other systems.

First, an acquiring section, such as the acquiring section 110, may acquire the map data of the geographic space to be managed by the system (S610). The acquiring section may acquire map data of a geographic space that includes one or more cities, one or more towns, and the like. The acquiring section may include map data of a geographic space including one or more states, countries, continents, etc. A dividing section, such as the dividing section 130, may divide the map area to generate a plurality of regions.

Next, the system may perform an initialization process for the mobile object (S620). The system may perform the process of S620 if a user (passenger) initializes a setting of a mobile object and any passengers of the mobile object, before starting to drive the mobile object.

After S620, a gateway apparatus, such as the gateway apparatus 160, of the system may acquire a car probe data from the mobile object (S630). Although the system may acquire the car probe data from the plurality of the mobile objects, the system acquiring a car probe data from one mobile object (which, may be referred to as "a target mobile object") is explained in the below description. The car probe data may include information detected by the target mobile object, such as current position information of the target mobile object, a speed and/or direction of the target mobile object, and event information observed by the target mobile object (e.g., occurrence of ABS, detection of obstacles, or the like). In one embodiment, the position information may include an edge ID of an edge on which the target mobile object exists and the distance between the current location of the target mobile object and the one end of the edge.

Next, the gateway apparatus may determine a region on which the target mobile object is traveling based on the position information of the car probe data of the target mobile object (S640). In one embodiment, the gateway apparatus may inquire a region manager, such as the region manager 140, about the region on which the mobile object exists. A determining section, such as the determining section 146, of the region manager may determine the region the target mobile object and provide the gateway apparatus with the information of the region of the target mobile object. The gateway apparatus may provide an event server, such as the event server 210, that manages the determined region and a mobile object server, such as the mobile object server 220, that manages the determined region with the car probe data.

Next, the event server that is provided with the car probe data of the target mobile object may process events for the mobile objects (S650). The event server may manage event information based on the car probe data for notification of events to the target mobile object.

After S650, the mobile object server that is provided with the car probe data of the target mobile object may manage a mobile object agent for the target mobile object (S660).

After S660, the system determines whether to end the process for the target mobile object at S680. In one embodiment, the gateway apparatus may determine whether the car probe date indicates the engine stop of the target mobile object. If the system determines not to end the process, then the system proceeds with the process of S630 for the target mobile object. If the system determines to end the process, then the system ends the process for the target mobile object, and may continue the process for other mobile objects.

As described above, the system manages mobile objects by utilizing mobile object agents realized by the plurality of the mobile object servers. Since the system can transfer the mobile object agent between the mobile object servers, it can efficiently manage the mobile objects traveling around the plurality of regions. Furthermore, the system collects car probe data from the mobile objects and manages events generated from the car probe data by utilizing the event agents. Since each event server divides a number of events occurring on its managing regions into a plurality of areas by utilizing the event agents, it can efficiently handle event information.

The process of S610 may be performed once before starting processes S620-S680. The process of S620-S680 may be performed for every mobile object.

Figure 7:
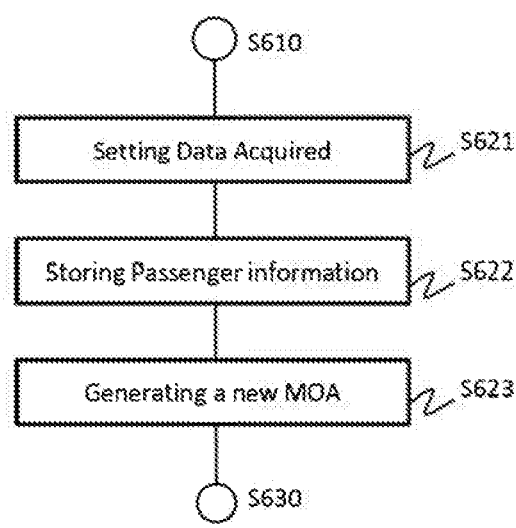
FIG. 7 shows an operational flow of S620 according to the present embodiment.

FIG. 7 shows an operational flow of an initialization process for a mobile object, according to an embodiment of the present invention. The present embodiment describes an example in which the system performs an initialization process, such as the initialization process of S620 of FIG. 6, through processes S621 to S623 shown in FIG. 7.

First, a gateway apparatus receives a setting data (including an ID of the mobile object, an ID(s) of passenger(s) and position information of the mobile object) from the mobile object (S621). The gateway apparatus determines one mobile object server that manages the mobile object based on the position information of the mobile object. The gateway apparatus provides the determined mobile object server with the setting data. Then, the determined mobile object server obtains information (e.g., ID(s) of the passenger(s)) of at least one passenger of the mobile object from the setting data of the mobile object.

Then, the mobile object server may request the object agent of the object server for the mobile object to store the information of the at least one passenger of the mobile object (S622). For example, each mobile object may be mapped to each object agent of the object servers based on values of the IDs of the mobile objects, and the mobile object server may identify one object agent corresponding to the ID of the mobile object based on the calculation using the ID. Then, the mobile object server may provide the object server managing the identified object agent with the setting data including the position information, the ID of the mobile object, and ID(s) of passenger(s) of the mobile object via the gateway apparatus.

Next, the object server stores the information of passenger (s) on an object agent. In one embodiment, each of passengers may be preliminarily mapped to each of the passenger servers based on values of the IDs of passengers, and the passenger servers may have information of passengers. The object server may identify one passenger server corresponding to the ID of a passenger based on the calculation using the ID. The object server may receive, via the gateway apparatus, the information of passengers from the passenger server corresponding to the ID. Then, the object server may store or update the information of the mobile object and the passengers of the mobile object, in the object agent for the mobile object. The object server may include the information of a region that the mobile object currently exists, in the object agent.

Next, the mobile object server 220 managing the region in which the mobile object 10 exists generates a new mobile object agent for the mobile object 10 (S623). In one embodiment, the mobile object server 220 may copy the information of the object agent for the mobile object 10 to the newly generated mobile object agent. For example, the mobile object server 220 may store the information of the mobile object 10 and the information of the at least one passenger of the mobile object 10 in the newly generated mobile object agent for the mobile object 10.

Figure 8:
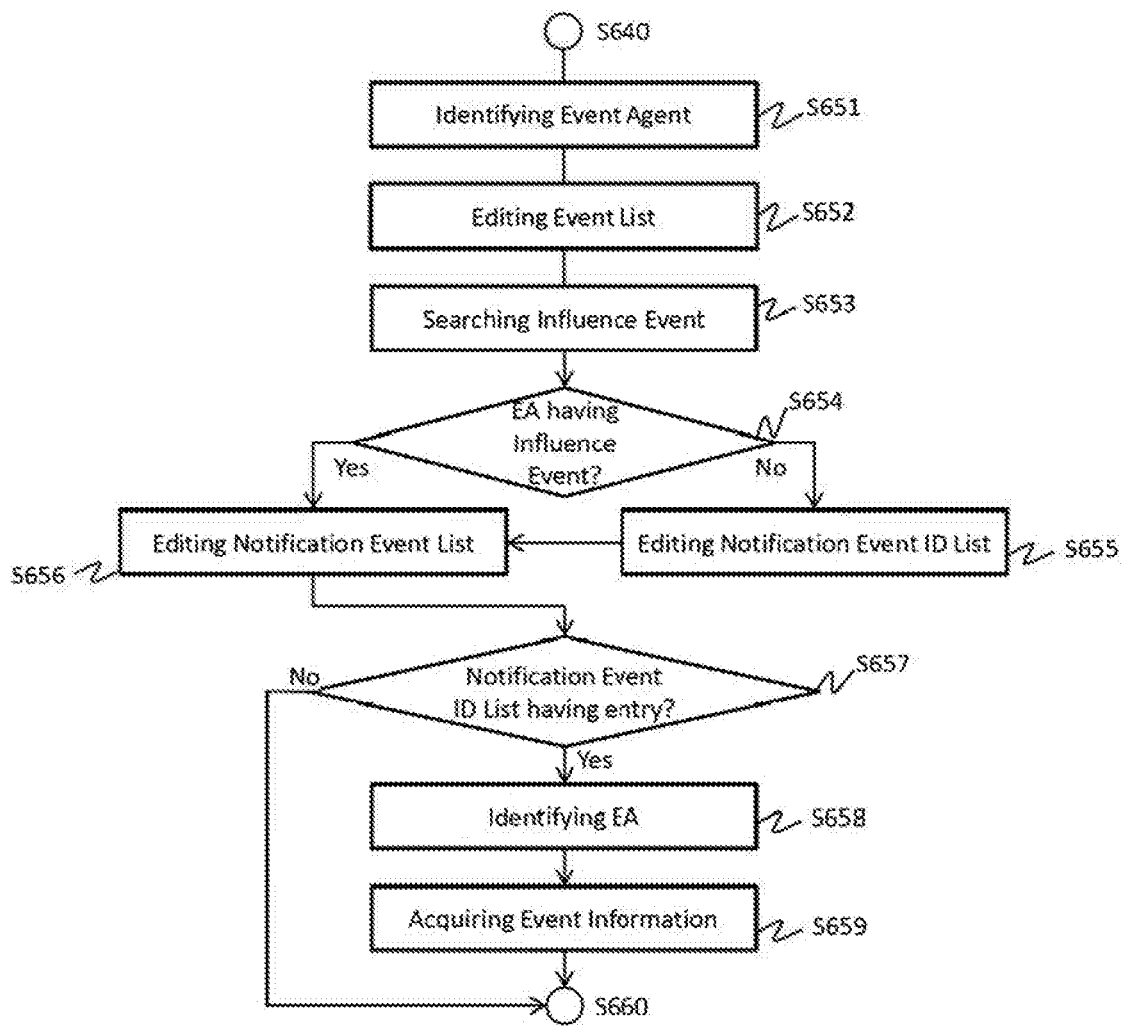
FIG. 8 shows an operational flow of S650 according to the present embodiment.

FIG. 8 shows an operational flow of event processing, according to an embodiment of the present invention. The present embodiment describes an example in which the system performs event processing, such as the event processing of S650 of FIG. 6, through processes S651 to S659 shown in FIG. 8.

First, the event server may identify an event agent (S651). In one embodiment, the event server determines one event agent from the plurality of event agents based on the position information of the target mobile object. The determined event agent may be referred to as "target event agent." For example, the event server determines a target route (or an edge of the map data) of the target mobile object based on the position information and the map data, and selects, as a target event agent, an event agent that manages an area including the target route of the target mobile object indicated by the car probe data. In another embodiment, the car probe data of a target mobile object may include the information of the target route of the target mobile object.

Next, the event server may edit event lists by the target event agent based on the car probe data (S652). In one embodiment, the target event agent may generate or update information of events (e.g., an edge that an event occurs, an event ID, a location of an event, and content of event) of the target route on the event list based on information of the car probe data. The event of the target route may be referred to as a "target event."

Next, the event server may search, by the target event agent, an influence event on the target route on the area of the target event agent based on the car probe data (S653). The influence event of the target route relates to an event on another route within a threshold distance (e.g., a threshold travelling distance of the target route, a threshold number of edges away from the target route, and/or a threshold travelling time from the target route).

In one embodiment, the target event agent itself may search routes (or edge IDs) apart from the target route within the threshold distance based on the topology information of routes in the regions, or may request other entities (e.g., a server) to search for routes (or edge IDs).

Next, the event server may determine whether the event list of the target event agent includes event entries corresponding to all influence events of the target route searched at S653 (S654). In one embodiment, the target event agent determines whether edges of the influence events are listed as edge IDs of events in the event list.

If an area managed by a target event agent includes the routes (edges) of all influence events relating to an event, then an event list of the target event agent includes corresponding event entries of all influence events. However, if the routes (edges) of any influence events are managed by other event agents, then the event list may not include corresponding event entries of all influence events. If the decision is positive, then the event server proceeds with the process S656 and if negative, the event server proceeds with the process S655.

At S655, the event server may edit a notification event ID list by the target event agent. The notification event ID list includes IDs of influence events and edge IDs of the influence events that are determined to be not included in the event list of the target event agent at S654. In other words, the notification event ID list is a list of event IDs of influence events that are not managed by the target event agent. Then, the event server may proceed with the process of S656.

At S656, the event server may edit a notification event list for the target mobile object, by the target event agent. The notification event list is a list of events that may be helpful to the target mobile object traveling on the target route. The notification event list may include target events and influence events of the target events. The target event agent may add entries of the target events and the influence events in its managing event list for notification.

Next, the event server determines, by the target event agent, whether the notification event ID list has at least one entry at S657. If the decision is positive, then the event server proceeds with the process of S658, and if negative, then the event server ends the process of S650.

At S658, the event server may identify, by the target event agent, an event agent that manages an event list including events in the notification event ID list. The determined event agent may be referred to as "remote event agent."

Next, the event server may acquire information of events in the notification event ID list (S659), and end the process S650. In one embodiment, the target event agent may receive information of events in the notification event ID list from the remote event agent, and edit the notification event list based on the acquired information. In another embodiment, the target event agent may add entries of the influence events in the notification event ID list based on the acquired information.

FIG. 9 shows an illustrative example of an event list, according to an embodiment of the present invention. As described in FIG. 9, the event list may include edge IDs of events, event IDs of events, locations of events, specific contents of events, and influence events relating to events. In this embodiment, each route is represented as "edge." For example, this event list indicates that an event (identified as "Eve 0214") has occurred along the full length of edge 0001 on the area, that the event has limited the speed to 30 km/h, and that edge 0001 includes an influence event identified as "Eve 0114." The event list also indicates that an event (identified as "Eve 0114" on edge 0002) has occurred 32 m from the 1st node on edge 0002 on the area, that the event is a closure of a route, and that "Eve 0114" includes influence events identified as "Eve 0214" on edge 0001, "Eve 0421" on edge 0003, etc. In one embodiment, the target event agent may add a new entry corresponding to an event detected by the car probe data, in the event list.

According to the first entry in the event list of FIG. 9, the edge 0001 has influence event 0114. This may mean that a mobile object traveling on the edge 0001 is influenced by the event 0114 that has occurred apart from edge 0001 within a threshold distance. In response to receiving the car probe data including the position information indicating that the target mobile object is traveling on the edge 0001, the target event agent searches and obtains routes (edge IDs) apart from the target route (edge 0001) within the threshold distance, and then finds neighboring edge 0002 as a result. In response to receiving the car probe data including the position information of the edge 0001, the target event agent determines whether the edge of influence event (edge 0002) corresponding to the target route is listed as edge IDs in the event list.

The target event agent assigned to the area may generate or update a candidate event based on information from the target mobile object. In one embodiment, the target event agent may generate or update candidate events on the candidate event list including information of a plurality of edges on the area of the event agent based on information of the car probe data.

Although the event list of FIG. 9 includes information of influence events, the information of the influence events may be managed by another list. In one embodiment, the event agent may manage both a first event list containing information of an event on the target route and a second event list containing information of the influence event.

FIG. 10 shows an illustrative example of a candidate event list, according to an embodiment of the present invention. As described in FIG. 10, the event list may include edge IDs of candidate events, counts of detecting candidate events, locations of candidate events, and specific contents of candidate events for each candidate event. For example, this candidate event list indicates that evidence of an event (congestion) has been observed twice along the full length of edge 0009 on the area, and that evidence of an event (skid) has been observed once at a point 15 m from the 2nd node on edge 0013 on the area.

The target event agent may determine whether to change a candidate event in the candidate event list to an event in the event list. In one embodiment, the target event agent may upgrade the candidate event to the event based on information from other mobile objects. In this case, the target event agent counts occurrences of a candidate event observed by a plurality of mobile objects (including the target mobile object and other mobile objects). If the count of a candidate event exceeds a threshold value, then the target event agent determines that the candidate event is upgraded to an event. In one embodiment, in response to the upgrade, the target event agent deletes the entry of the candidate event from the candidate event list, and generates a new entry of an event corresponding to the deleted candidate event. The event servers may set the same or different criteria for upgrading candidate events among the plurality of event agents.

FIG. 11 shows an illustrative example of a notification event list, according to an embodiment of the present invention. As described in FIG. 11, the notification event list may include edge IDs of target/influence events, event IDs of target/influence events, locations of target/influence events, and specific contents of target/influence events. For example, this notification event list indicates that an event (speed limit) has occurred along the full length of edge 0001 on the area, and that an event (closure) has occurred at a point 32 m from the 1st node on edge 0002 on the area.

Figure 12:
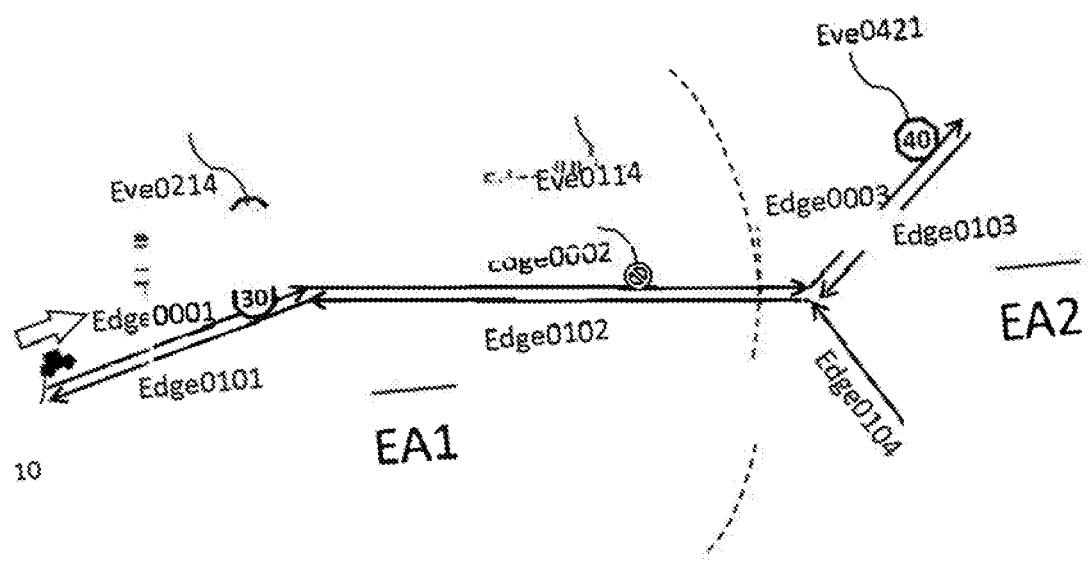
FIG. 12 shows a mobile object 10 and events according to one embodiment.

FIG. 12 shows a mobile object and events, according to an embodiment of the present invention. In the embodiment of FIG. 12, the target mobile object 10 is traveling eastbound on the edge 0001, which is the target route. The target event agent EA1 manages an area including the edge 0001, the edge 0002, the edge 0101, and the edge 0102, and the neighboring event agent EA2 manages an area including the edge 0003, the edge 0103, and the edge 0104.

Direction dependent edges are described in FIG. 12. However, edges may not be direction dependent according to other embodiments, and in such embodiments, the event agent may manage events, candidate events, and influence events with direction information. The target event agent EA1 manages an event (Eve 0214) on the edge 0001 as the target event in the event list. Since the edge 0002 is apart from the edge 0001 within the threshold distance, the target event agent EA1 also manages an event (Eve 0114) on the edge 0002 as an influence event in the event list. The target event agent EA1 manages a notification event list including the target event (Eve 0214) and the influence event (Eve 0114) for the target mobile object 10.

In the embodiment of FIG. 12, the mobile object agent managing target mobile object requests the event agent EA1 that manages the target event (e.g., Eve 0214) and the influence event (e.g., Eve 0114) to send the notification event list including the target event and the influence event. In another embodiment, the mobile object agent may request the remote event agent EA2 that manages the information of influence event(s) (e.g., Eve 0421) to send a notification event list containing information of the influence event(s) if the influence event is located outside of the area including the target route (Edge 0001).

Figure 13:
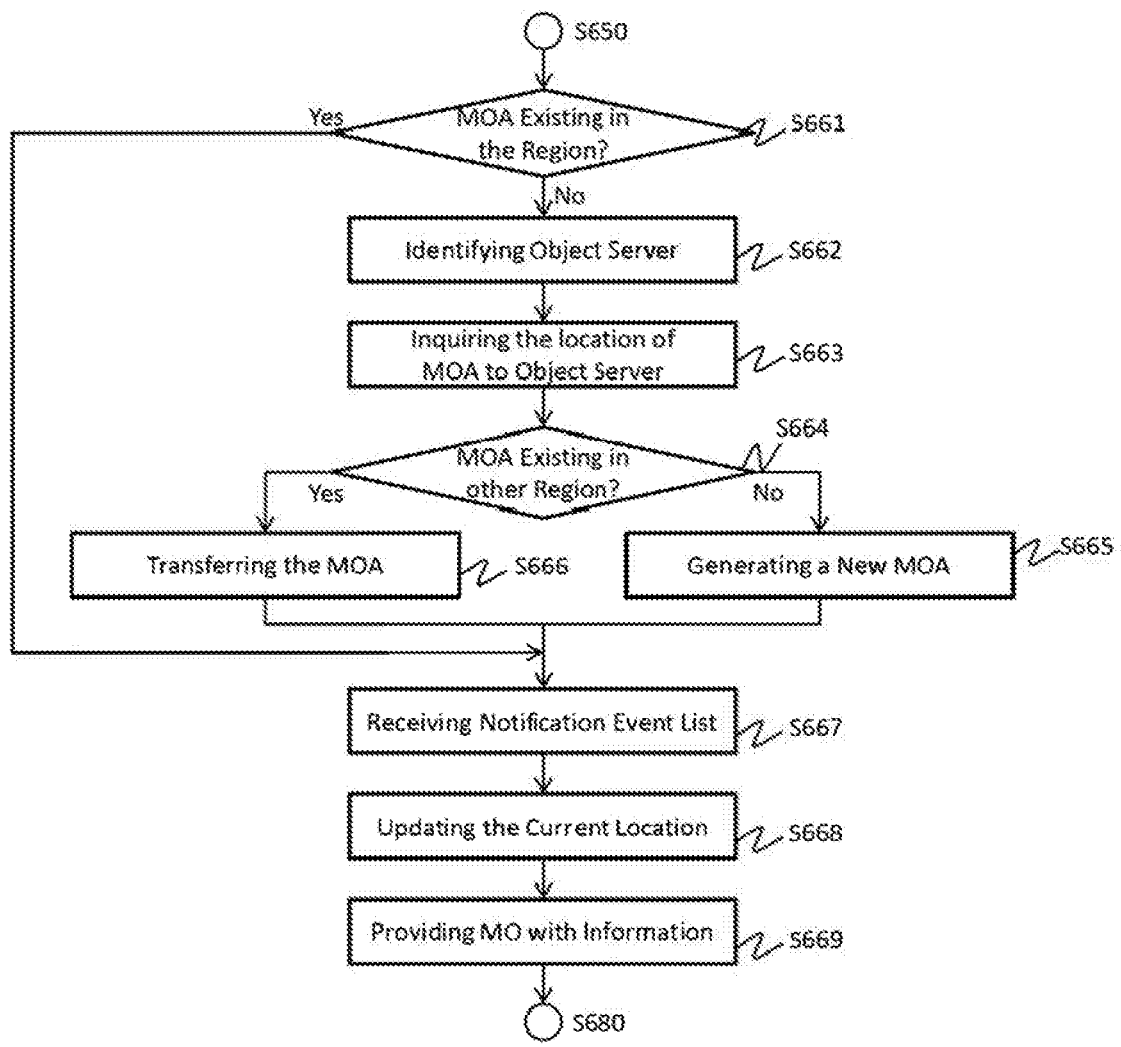
FIG. 13 shows an operational flow of S660 according to the present embodiment.

FIG. 13 shows an operational flow of mobile object processing, according to an embodiment of the present invention. The present embodiment describes an example in which the system manages the target mobile object, such as in S660 of FIG. 6, through processes S661 to S669 shown in FIG. 13.

At S661, the mobile object server may determine whether the mobile object agent for the target mobile object exists in the region determined to be the region of the mobile object, such as the region determined at S640. In other words, the mobile object server determines whether the mobile object server manages the mobile object agent of the target mobile object. If the decision is positive, then the mobile object server proceeds with the process S667, and if negative, the mobile object server proceeds with the process S662.

At S662, the mobile object server may identify an object server that includes the object agent containing the information of the target mobile object. In one embodiment, the mobile object server may identify the object server in the same manner described in S622.

Next, at S663, the mobile object server may inquire the object server 230 identified at S662 for the location of the mobile object agent of the target mobile object. The object server may refer to the object agent of the target mobile object, obtain information of the mobile object server that currently manages the mobile object agent MOA of the target mobile object, if it exists, and provide the mobile object server with the information.

Next, the mobile object server may determine whether the mobile object agent for the target mobile object exists in any other regions. In other words, the mobile object server may determine which mobile object server manages the mobile object agent for the target mobile object from the plurality of mobile object servers managing other regions, at S664. If the decision is positive, then the mobile object server proceeds with the process S666, and if negative the mobile object server proceeds with the process S665.

At S665, the mobile object server generates a new mobile object agent MOA for the target mobile object. The mobile object server may generate the mobile object agent MOA for the target mobile object by obtaining information of the target mobile object from the object server that includes the object agent containing the information of the target mobile object. In one embodiment, the mobile object server may generate the new mobile object agent in the same manner described in S623. The mobile object server may also communicate with the object server via the gateway apparatus, and register the current region of the target mobile object in the object agent corresponding to the target mobile object. By generating the new mobile object agent, the system can handle a new mobile object 10 that has been not managed by the mobile object server.

At S666, the mobile object server may transfer the mobile object agent from the other mobile object server determined to manage the mobile object agent for the target mobile object at S664. In one embodiment, the mobile object server may receive information of the mobile object agent for the target mobile object from the other mobile object server, and generate a new mobile object agent including the received information. The mobile object server may also communicate with the object server via the gateway apparatus, and register the current region of the target mobile object in the object agent of the target mobile object.

Next, at S667, the mobile object server may receive a notification event list for the target mobile object. In one embodiment, the mobile object server first determines the target route where the target mobile object is located. Then, the mobile object server may request the event agent that manages the information of target event(s) and influence event(s) corresponding to the target route to send a notification event list containing information of the target event(s) and influence event(s) of the target route.

At S668, the mobile object server may update the current location of the target mobile object by the mobile object agent. In one embodiment, the mobile object agent for the target mobile object updates the current location of the target mobile object based on the position information of the car probe data.

At S669, the mobile object server may execute the mobile object agent for the target mobile object to provide the target mobile object with information that assists the target mobile object with traveling in the geographic space based on the information included in the event list. In one embodiment, the mobile object agent may provide the target mobile object with information of events on the notification event list.

In one embodiment, the at least one mobile object server may execute the mobile object agent for the target mobile object to provide the target mobile object with information that assists the target mobile object with traveling in the geographic space based on the information of the at least one passenger of the target mobile object. For example, the mobile object agent may provide the target mobile object with an alert, a notice, and/or an action list relating events on the notification event list depending on a number of passengers (e.g., for guiding a car pool lane), the age, gender, license, real time information (e.g., driving history or sleep history), and characteristics of the passengers.

The action list is a list of actions recommended to passengers in response to the events (e.g., braking, accelerating, and/or steering of the target mobile object).

The action list may include commands to the target mobile object for automatic driving and/or driving assist. In one embodiment, the mobile object agent may include information that the passenger is sensitive to rough driving, and then the mobile object agent may provide commands to gently drive the target mobile object. In one embodiment, the mobile object agent may include information of driving skill of a driver passenger, and then provide different commands depending on the skill of the driver. The mobile object server may provide the target mobile object with the information via the gateway apparatus.

As described above, the mobile object server receives information from the target mobile object in the region assigned to the mobile object server, and generates the mobile object agent for the target mobile object if there is no mobile object server among the plurality of mobile object servers that is executing the mobile object agent.

Figure 14:
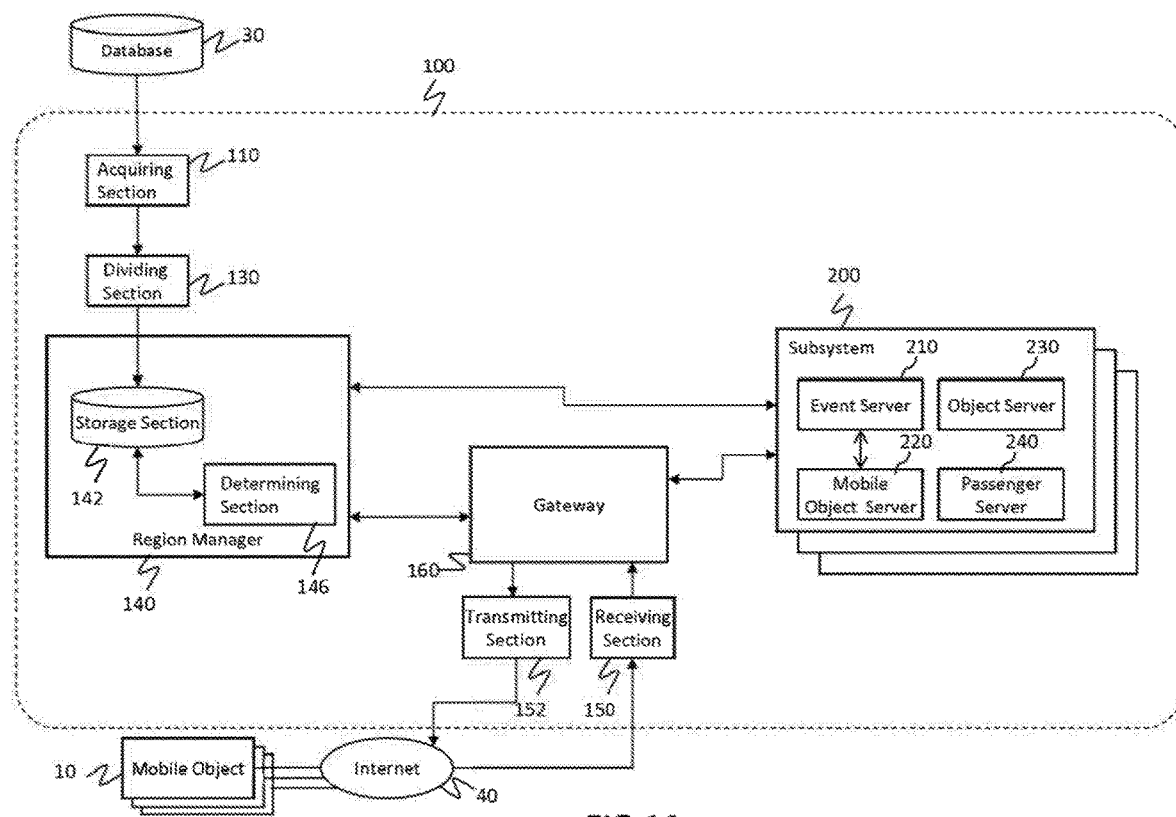
FIG. 14 shows a second exemplary configuration of the system 100 according to the present embodiment.

FIG. 14 shows an exemplary configuration of the system 100, according to an embodiment of the present invention. In the system 100 according to the present embodiment, components that have substantially the same operation as components of the system 100 according to the present embodiment shown in FIG. 3 are given the same reference numerals, and descriptions thereof are omitted. In this embodiment, each subsystem 200 includes an event server 210, mobile object server 220, an object server 230, and a passenger server 240. However, other embodiments are also possible, in which each subsystem 200 comprises any combination of singles or multiples of each server. In other embodiments, the system 100 may manage allocation of object agents of the object server 230 and passenger agents of the passenger server 240 in the subsystem 200. For example, the gateway apparatus 160 may change allocation of the object/passenger agents to the subsystems 200 to rectify the imbalance of data processing loads among the subsystems 200.

In the embodiment described above, the event server 210 may manage allocated event agents. In other embodiments, the system 100 may manage allocation of event agents to the event servers 210. For example, the gateway apparatus 160 may change allocation of event agents to the event servers 210 to rectify the imbalance of loads of processing events among the event servers 210. In the embodiment described above, the event server 210 causes each event agent to manage allocated divided area derived from a region. In other embodiment, the event server 210 causes at least one event agent to manage specific information regarding events (e.g., cross section of roads or other specific function(s) of a map, or, hurricane or other disaster/accident).

In the manner described above, the system 100 according to the present embodiment may be operable to assist with movement of a plurality of mobile objects 10 in a geographic space. For example, the system 100 can provide event information concerning events that occur on a movement route from the current position of a mobile object 10 to a destination. Furthermore, the system 100 can provide a mobile object 10 with a prediction result by predicting a route to reach the destination in the shortest time while avoiding traffic jams and the like, from among movement routes from the current position of this mobile object 10 to the destination.

However, since the actual accidents, obstructions, traffic conditions, weather, and the like on the road change during the movement of the automobile, even if the event information acquired at one time is supplied to the mobile objects 10, there are cases where the actual conditions on the road differ from the event information. For example, if a plan includes movement that accompanies the passage of time used for a rest, meals, stops along the way, or the like, while travelling to the destination from the current position, it is difficult to realize high prediction accuracy when the conditions on the movement route are predicted using just the event information at the point in time when the movement begins.

Therefore, the system 100 according to the present embodiment may be operable to adapt to such event information that changes in time series, and to accurately assist with the movement of the mobile object 10 even when the movement occurs over time. Such a system 100 is described as a third exemplary configuration of the system 100 according to the present embodiment. In the system 100 having the third exemplary configuration, a plurality of event agents may be operable to manage event information at one timing while a plurality of predictive environment agents may be operable to manage expected event information at a future timing after the one timing.

Figure 15:
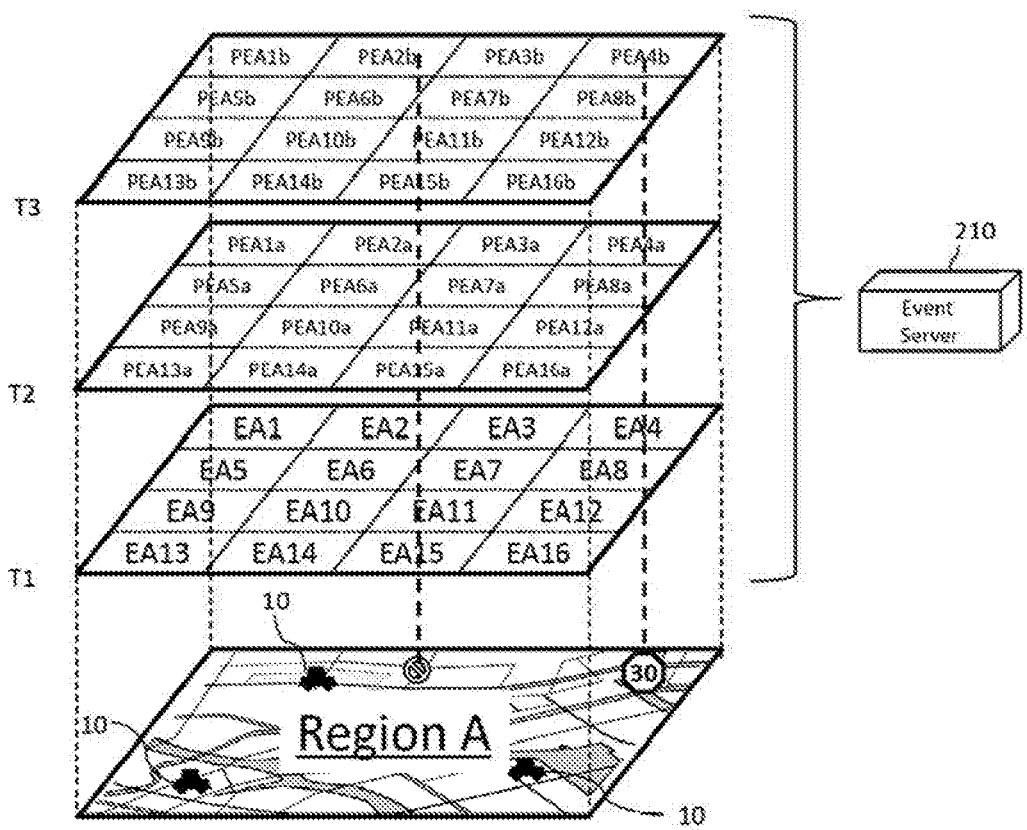
FIG. 15 shows a general configuration of the event agents and the predictive environment agents executed by the event server 210 according to the present embodiment.

FIG. 15 shows a general configuration of the event agents and the predictive environment agents executed by the event server 210 according to the present embodiment. Here, each event agent is labeled as EA and each predictive environment agent is labeled as PEA. The event server 210 may be operable to execute a plurality of EAs corresponding respectively to each area, in order to manage the events occurring in the plurality of areas, as described in the example of FIG. 2. FIG. 15 shows an example of mobile objects 10 traveling on a target route on region A in which a region A is divided into sixteen areas, sixteen EAs are assigned respectively to the sixteen areas resulting from the division, and each EA manages a corresponding area, in the same manner as in FIG. 2.

Here, the sixteen EAs may each be operable to manage an event that was generated or acquired during a predetermined time interval, as an event at the timing T1. For example, EA2 may manage the "closure" event in the area displayed along with EA2 on the map, as the event at the timing T1. Furthermore, EA4 may manage the "speed limit" event in the area displayed along with EA4 on the map, as the event at the timing T1.

The event server 210 may be operable to, in addition to executing such EAs, execute a plurality of PEAs that manage expected events at future timings differing from the timing T1. Here, the plurality of PEAs may correspond respectively to the plurality of areas managed by the plurality of EAs. In other words, the plurality of EAs and PEAs may be assigned to every one of the same regions in the geographic space.

FIG. 15 shows an example in which a total of sixteen PEAs from PEA1a to PEA16a are assigned respectively to the sixteen areas resulting from the division and correspond to each area managed by one of the sixteen EAs, and the expected events in these 16 areas at the timing T2 are each managed by the corresponding PEA. Furthermore, FIG. 15 shows an example in which a total of sixteen PEAs from PEA1b to PEA16b are assigned respectively to the sixteen areas resulting from the division and correspond to each area managed by one of the sixteen EAs, and the expected events in these sixteen areas at the timing T3 are each managed by the corresponding PEA.

PEA1a to PEA16a may manage events that are predicted to occur at the timing T2. For example, according to a prediction result that the "closure" event will continue until the timing T2 in the area managed by EA2, PEA2a may manage this "closure" event as the expected event at the timing T2.

Furthermore, PEA1b to PEA16b may manage events that are predicted to occur at the timing T3. For example, according to a prediction result that the "closure" event will continue until the timing T3 in the area managed by EA2, PEA2b may manage this "closure" event as the expected event at the timing T3. As a further example, according to a prediction result that the "speed limit" event will continue until the timing T3 in the area managed by EA4, PEA4b may manage this "speed limit" event as the expected event at the timing T3.

Furthermore, the plurality of EAs and the plurality of PEAs may update the information of the events being managed, in accordance with the passage of time. In other words, in response to time passing from the timing T1 to the timing T2, the sixteen EAs may manage a plurality of events at the timing T2. Similarly, the total of sixteen PEAs from PEA1a to PEA16a may manage a plurality of expected events at the timing T3.

In the manner described above, the system 100 having the third exemplary configuration may assign a plurality of PEAs for managing expected events, during each of a plurality of predetermined time intervals. These time intervals may be substantially constant time intervals. Furthermore, the system 100 may cause the time intervals to be variable depending on the event. The system 100 may be operable to handle event information that changes in time series, by using the corresponding plurality of PEAs to manage the time-series changing of the events managed by the plurality of EAs. The following describes an exemplary configuration of the system 100 having the third exemplary configuration.

Figure 16:
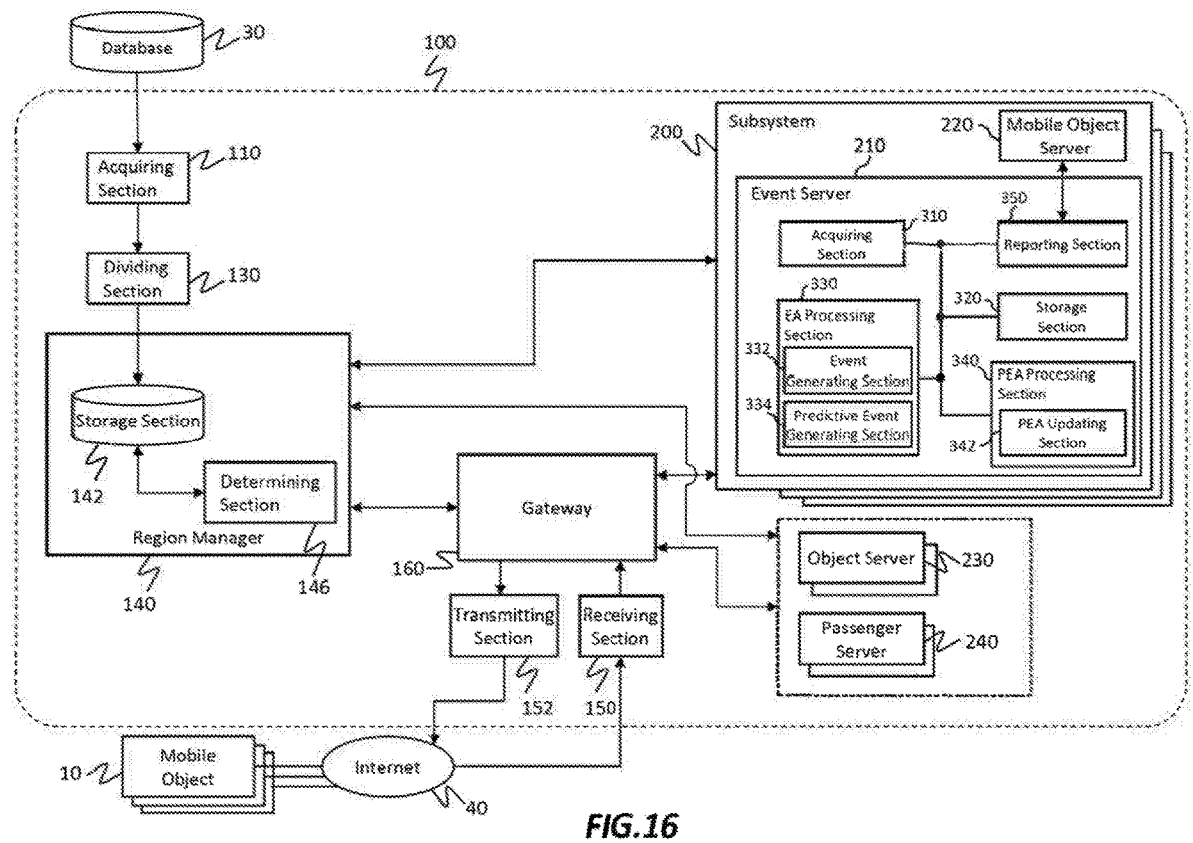
FIG. 16 shows the third exemplary configuration of the system 100 according to the present embodiment.

FIG. 16 shows the third exemplary configuration of the system 100 according to the present embodiment. In the system 100 according to the present embodiment, components that have substantially the same operation as components of the system 100 according to the present embodiment shown in FIG. 3 and FIG. 14 are given the same reference numerals, and descriptions thereof are omitted. In the system 100 having the third exemplary configuration, at least one subsystem 200 includes an event server 210 that is operable to predict and manage future events. In the present embodiment, the event server 210 of each subsystem 200 further includes an acquiring section 310, a storage section 320, an EA processing section 330, a PEA processing section 340, and a reporting section 350.

The acquiring section 310 may be operable to acquire information relating to an event. The acquiring section 310 may acquire input information relating to the event from outside the system 100, via the network or the like. The acquiring section 310 acquires, as the input information relating to the event, weather information, traffic jam information, accident information, travel regulation information, emergency vehicle movement information, or the like in each portion of the geographic space, for example. Furthermore, the acquiring section 310 may acquire detection information relating to the event, which is detected by at least one mobile object 10 among the plurality of mobile objects 10. For example, the acquiring section 310 acquires, as the detection information relating to the event, weather conditions, traffic jam conditions, accident conditions, travel regulation conditions, pedestrian crossing conditions, obstruction conditions, and the like on the road detected by a mobile object 10.

The storage section 320 may be operable to store the input information and detection information acquired by the acquiring section 310. Furthermore, the storage section 320 may store geographic data managed by the subsystem 200. The storage section 320 may store the input information and detection information in association with the position of this geographic data. Furthermore, the storage section 320 may store each of intermediate data, calculation results, parameters, and the like that are generated by or used in the process of managing the plurality of mobile objects 10 and the plurality of events performed by the subsystem 200. The storage section 320 may supply the stored data to the source of a request, in response to any component in the system 100 making a request.

The EA processing section 330 may be operable to perform a process of the EA handling an event occurring in the geographic space in which the plurality of mobile objects 10 move. The EA processing section 330 may be operable to manage each event occurring within a predetermined time interval in the geographic space, as an event at one time point. The EA processing section 330 may be operable to perform the processing of events described in FIG. 8. The EA processing section 330 may be operable to update the plurality of EAs in response to reaching an earliest future timing among a plurality of future timings, as a result of the passage of time. The EA processing section 330 includes an event generating section 332 and a predictive event generating section 334.

The event generating section 332 may be operable to generate an event based on at least one of the input information and the detection information. The event generating section 332 may generate an event corresponding to the input information. The event generating section 332 generates the weather, traffic, accidents, travel regulations, emergency vehicles, and the like on the road as the events, in association with positions on the road, for example. Furthermore, the event generating section 332 may generate an event corresponding to the detection information from the mobile object 10, in association with a position on the road.

The event generating section 332 may generate an event by analyzing the input information and/or the detection information. The event generating section 332 may generate an event that is a slippery road, in response to a number of mobile objects 10 that is greater than or equal to a threshold value activating their ABS (Antilock Brake System) in the same region on the road, for example.

The predictive event generating section 334 may be operable to generate an expected event that is to be handled by each of at least one of the plurality of PEAs, based on an event newly generated by the event generating section 332. Here, the expected event may be an event obtained by predicting the change in time series of an event handled by an EA.

The predictive event generating section 334 may generate the expected event based on the event generated according to the input information and on this input information. For example, according to input information providing notification of construction on the road, the event generating section 332 generates the "construction" event. Then, if a scheduled time for the construction time range, construction period, and the like are included in this input information, the predictive event generating section 334 may generate the "construction" expected event corresponding to this scheduled time.

The predictive event generating section 334 may be operable to generate the expected event by analyzing the input information and/or detection information. For example, the event generating section 332 generates the "emergency vehicle" event according to input information providing notification that an emergency vehicle is passing by and/or detection information obtained by detecting the passage of an emergency vehicle. The predictive event generating section 334 may then predict the movement route of this emergency vehicle according to information such as the movement speed, movement direction, destination, patrol route, or the like of the emergency vehicle, and may generate the "emergency vehicle" expected event.

The predictive event generating section 334 may be operable to generate the expected event using a past history. For example, the predictive event generating section 334 predicts the time during which a traffic jam caused by an accident will continue, by using the history of past accidents, and generates the "traffic jam" expected event. Furthermore, the predictive event generating section 334 may predict the continuation time of the traffic jam using a trend of past traffic jams corresponding to the day of the week and time range, and generate the "traffic jam" expected event.

The predictive event generating section 334 may be operable to further generate a derived expected event that is predicted to be derived from a generated expected event, after the expected event has been generated. For example, after the generation of the "emergency vehicle" expected event, if a prediction is made that a traffic jam will occur due to this emergency vehicle passing through a road on which a plurality of mobile objects are moving, the predictive event generating section 334 generates the derived "traffic jam" expected event. The predictive event generating section 334 may calculate the timing at which this emergency vehicle reaches the road on which the plurality of mobile objects are moving, and may predict the timing at which the derived "traffic jam" expected event will occur.

The predictive event generating section 334 may supply the generated expected event to the PEA that is to manage this expected event. The PEA may store information concerning the generated expected event in association with a position on the map. The PEA may store a history of expected events.

The PEA processing section 340 may be operable to perform the processes of at least one PEA handling each expected event. The PEA processing section 340 may be operable to perform the processes of a plurality of PEAs corresponding to each of a plurality of future timings. The PEA processing section 340 may be operable to perform the processes of a plurality of PEAs corresponding to each of a plurality of future timings in every predetermined time interval. For example, as described in FIG. 15, the PEA processing section 340 may perform the processes of a plurality of PEAs corresponding to the future timings T2, T3, etc. that are after the timing T1 corresponding to the processes of the EAs. The PEA processing section 340 includes a PEA updating section 342.

The PEA updating section 342 may be operable to update a plurality of PEAs in response to reaching the earliest future timing among a plurality of future timings, as a result of the passage of time. For example, the PEA updating section 342 may update the plurality of PEAs if time has passed from the timing T1 to the timing T2, for example.

The reporting section 350 may be operable to report to one mobile object 10 about the information concerning the expected event handled by a PEA associated with the timing at which the one mobile object 10 passes through a geographic location, among the one or more PEAs. The reporting section 350 may report to the mobile object agent being executed by the mobile object server 220 about the information concerning the expected event, in response to a request from this mobile object agent. The reporting section 350 may acquire the information concerning the event and the expected event from the EA and the PEA respectively performed by the EA processing section 330 and the PEA processing section 340, and supply the mobile object agent with this information.

In the system 100 having the third exemplary configuration described above, the PEAs manage the future expected events for event information that changes in time series, and therefore the system 100 can accurately assist with the movement of mobile objects 10 even when this movement occurs along with the passage of time. The following describes the operation of the system 100 having the third exemplary configuration.

Figure 17:
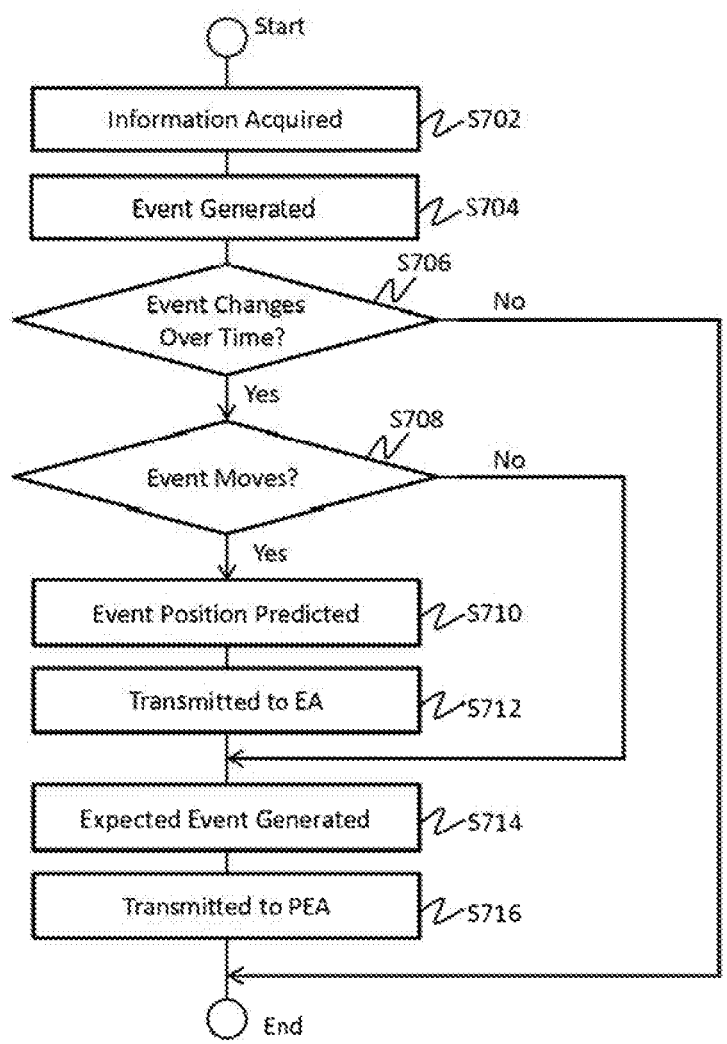
FIG. 17 shows a first exemplary operational flow of the system 100 having the third exemplary configuration according to the present embodiment.

FIG. 17 shows a first exemplary operational flow of the system 100 having the third exemplary configuration according to the present embodiment. The event server 210 according to the present embodiment may begin to generate the events and expected events in the geographic space and begin the management, by performing the operational flow shown in FIG. 17. Specifically, the operational flow shown in FIG. 17 may be performed by the event server 210 in addition to or instead of the event server processing (S650) described in FIG. 6 and FIG. 8.

First, at S702, the acquiring section 310 may acquire information relating to an event. The acquiring section 310 may acquire the input information and/or the detection information relating to the event. The acquiring section 310 may supply the acquired information to the EA processing section 330 and the PEA processing section 340. Instead of or in addition to this, the acquiring section 310 may store the acquired information in the storage section 320.

Next, at S704, the event generating section 332 may generate the event corresponding to the information acquired by the acquiring section 310. The event generating section 332 may supply the generated event to the EA that is to manage this event. The EA may store the information concerning the generated event in association with a position on the map. The EA may store a history of events.

Next, at S706, the EA processing section 330 may judge whether the event generated by the event generating section 332 is an event that changes in time series. If the generated event is an event that does not change even after a predetermined interval has been exceeded, the EA processing section 330 may judge that this event is an event that does not change in time series (S706: No). The predetermined interval may be a relatively long time compared to the interval during which the mobile object 10 moves on the planned movement route, and may be one day or the like, for example.

If the input information indicates construction that has a construction period exceeding one day or has a construction scale that does not change for more than one day, for example, the EA processing section 330 may judge that this event is a "construction" event that does not change in time series. In this case, this "construction" event may be managed by the EA, in the same manner as the operation of the systems 100 having the first exemplary configuration and the second exemplary configuration. The EA processing section 330 may supply this "construction" event to the EA that is to manage this event, and may then end the operation for generating this "construction" event.

At S706, according to the type, content, or the like of the generated event, the EA processing section 330 may judge that this event is an event that changes in time series (S706: Yes). For example, if the event generating section 332 generates a "rain" event according to input information concerning the weather conditions that changes from rain in the morning to sunny in the afternoon, the EA processing section 330 may judge that this "rain" event is an event that changes in time series.

Next, at S708, the EA processing section 330 may judge whether the event generated by the event generating section 332 is an event that moves in the geographic space. For example, if the event generating section 332 generates the "rain" event according to input information concerning weather conditions of rain caused by rain clouds moving at a speed of 20 km/h, the EA processing section 330 may judge that this "rain" event is a moving event (S708: Yes).

At S710, the EA processing section 330 may predict a range in which an event is positioned as a result of the movement during a time interval to be processed by the EA, for this moving event. For example, the EA processing section 330 predicts the range in which the "rain" event is positioned in the geographic space according to the expected movement direction of the "rain" event, the expected movement speed, the expected time until the rain dissipates, and the like, for example.

Next, at S712, the EA processing section 330 may transmit the generated event to one or more EAs that manage the range in which the event is positioned. For example, the EA processing section 330 may transmit this "rain" event to all of the EAs that manage the range in which this "rain" event is positioned. In this way, even when localized heavy rain moves for a short time, for example, it is possible for the EAs corresponding to the region affected by this heavy rain to manage the "rain" event.

At S708, if it is judged that the event generated by the event generating section 332 is not an event that moves in the geographic space (S708: No), or following the process of S712 at which the information concerning a moving event is transmitted to the EA, the system 100 may perform the process of S714. At S714, the predictive event generating section 334 may generate the expected event. The predictive event generating section 334 may generate the expected event based on judgment material obtained by the judgment of an event that changes over time at S706. Furthermore, the predictive event generating section 334 may generate the expected event based on the judgment material obtained by the judgment of an event that moves in the geographic space at S708.

The predictive event generating section 334 generates the "rain" expected event at the timing T2 according to the expected movement direction, the expected movement speed, the expected time until dissipation, and the like of rain clouds, for example. In the same manner, the predictive event generating section 334 may generate the "rain" expected event at each timing from the timing T3 and later until the expected time until dissipation of the rain clouds has passed. The predictive event generating section 334 may associate information including at least one of the expected movement direction, the expected movement speed, the existence probability, the dissipation probability, and the change probability in association with an expected event.

Next, at S716, the predictive event generating section 334 may transmit the generated expected event to the PEA that manages the expected event. The predictive event generating section 334 may transmit the expected event to the PEA that is to perform management corresponding to a timing at which the expected event occurs and a position of the expected event in the geographic space.

As a result of the system 100 having the third exemplary configuration performing the operational flow described above, in addition to an EA managing an event, it is possible to generate and manage an expected event obtained by predicting change in time series of this event. The system 100 having the third exemplary configuration may assist with the movement of a plurality of mobile objects 10, using such expected events. The following describes the assistance operation of the system 100 having the third exemplary configuration.

Figure 18:
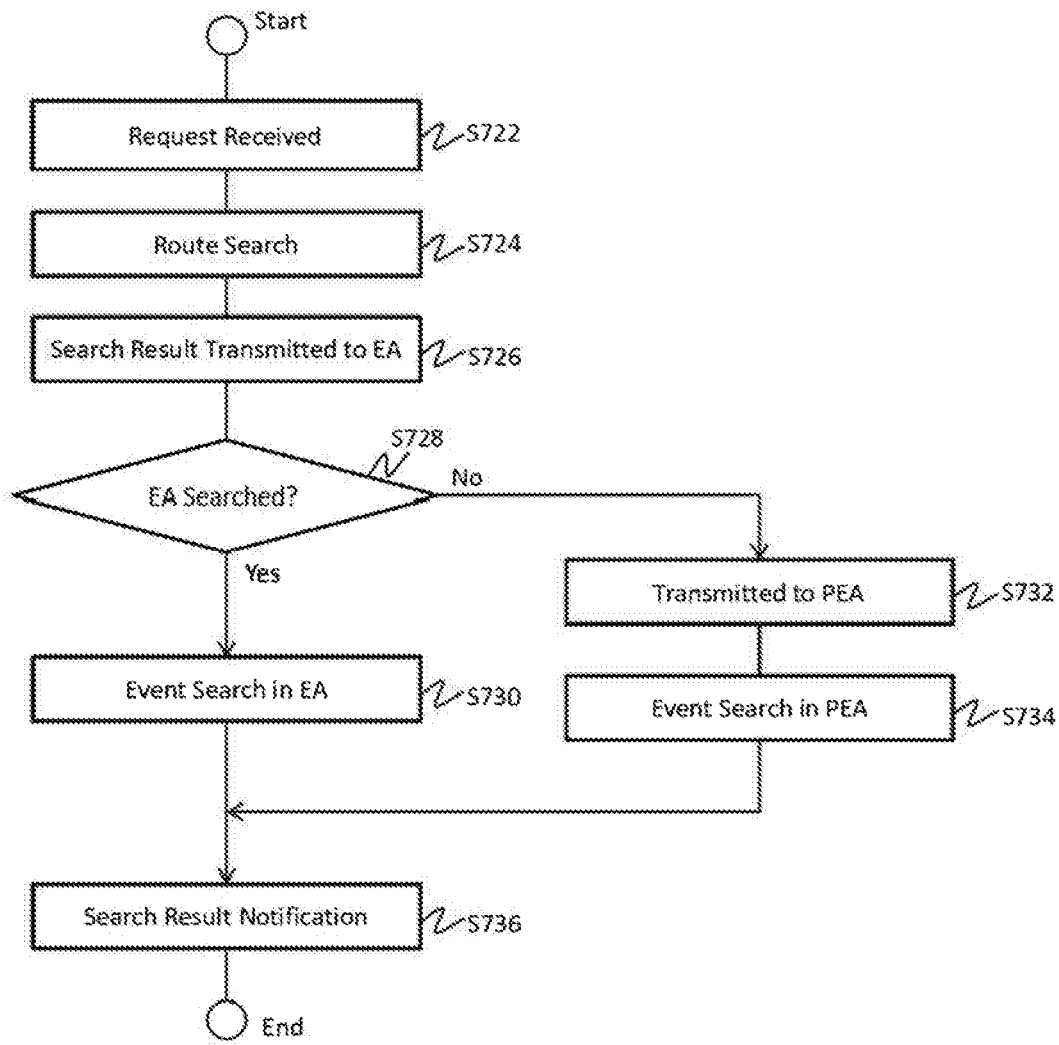
FIG. 18 shows a second exemplary operational flow of the system 100 having the third exemplary configuration according to the present embodiment.

FIG. 18 shows a second exemplary operational flow of the system 100 having the third exemplary configuration according to the present embodiment. The event server 210 and the mobile object server 220 according to the present embodiment may recommend a route by which a mobile object 10 can reach a destination, by performing the operational flow shown in FIG. 18. Specifically, the operational flow shown in FIG. 18 may be performed by the event server 210 and the mobile object server 220 in addition to or instead of the event server processing (S650) and the mobile object server processing (S660) described in FIG. 6, FIG. 8, and FIG. 13.

The mobile object server 220 according to the present embodiment may be operable to perform the processes of the mobile object agents associated with each of the plurality of mobile objects 10. In other words, the mobile object server 220 may function as the mobile object agent processing section.

First, at S722, the system 100 having the third exemplary configuration may receive information concerning a destination and a request for a route search from one mobile object 10. The system 100 may acquire route search conditions such as locations to be stopped at during travel, arrival timing, whether to use toll roads, whether to prioritize time, whether to avoid traffic jams, and the like. The mobile object server 220 may perform the mobile object agent corresponding to the one mobile object 10. This mobile object agent may read and acquire information concerning the current position. The mobile object agent may communicate with the one mobile object 10 to acquire the current position information.

Next, at S724, the mobile object agent may perform the route search from the current position to the destination position. The mobile object agent may search for a plurality of candidates for routes to the destination. Furthermore, if there are a plurality of route search conditions, the mobile object agent may search for the plurality of candidates using different priority rankings among the plurality of conditions.

Next, at S726, the mobile object may transmit the search result to one or more EAs that manage the routes included in this search result. For example, the mobile object agent transmits the information concerning portions managed by one EA among the routes in the search result to this one EA. Furthermore, the mobile object agent may transmit information concerning a scheduled timing for passing through the route in the search result to the EA. For example, the mobile object agent may transmit the scheduled timing at which the mobile object 10 is to pass through a portion managed by one EA in this route to the one EA, along with the information concerning the portion of this route.

If a route of the search result is managed by a plurality of EAs, the mobile object agent may transmit information concerning the portion of the route managed by each EA to these EAs. Furthermore, if there are a plurality of routes in the search result, the mobile object agent may transmit the information concerning the portion of the route to the plurality of EAs for every route. The mobile object agent may transmit the search result information via the reporting section 350.

Instead of this, the mobile object agent may transmit information concerning the route of the search result and the arrival time to the reporting section 350. The reporting section 350 may select one or more corresponding EAs, based on the received route. The reporting section 350 may transmit the route information and the arrival time information to the selected one or more EAs.

Next, at S728, the EA may judge the EA and the PEA to be searched, according to the received information concerning the scheduled timing. If the received scheduled timing is within a range of a time interval managed by this EA (S728: Yes), this EA may search for an event within this EA at S730. The EA may search for an event on the received route and pick up information concerning the event handled by the EA at a geographic location through which the one mobile object 10 passes.

Furthermore, if the received scheduled timing is outside a range of a time interval managed by this EA (S728: No), the EA may transmit the received information to the corresponding PEA at S732. The EA may set the corresponding PEA to be the PEA for which this scheduled timing is within the range of the time interval managed by the PEA, from among the plurality of PEAs. At S734, the corresponding PEA may search for an event on the received route and pick up information concerning the expected event handled by the PEA at a geographic location through which the one mobile object 10 passes. The PEA may transmit the search result to the EA. The EA may transmit the search result to the reporting section 350.

After the search by the EA and/or PEA, at S736, the reporting section 350 may provide a report of the search result. The reporting section 350 may provide a report including an organized summary of several search results, for every route that has been searched for by the mobile object agent.

In the manner described above, the reporting section 350 may be operable to receive a request from one mobile object agent associated with one mobile object 10, and search for an event in an EA and/or PEA. In this way, the reporting section 350 can report to the one mobile object agent about the information concerning the expected event handled by the PEA associated with the timing at which the one mobile object 10 passes through the geographic location, among the plurality of PEAs. In this way, the one mobile object agent can assist with the movement of the one mobile object 10, based on the information concerning the expected event reported to the one mobile object agent.

Figure 19:
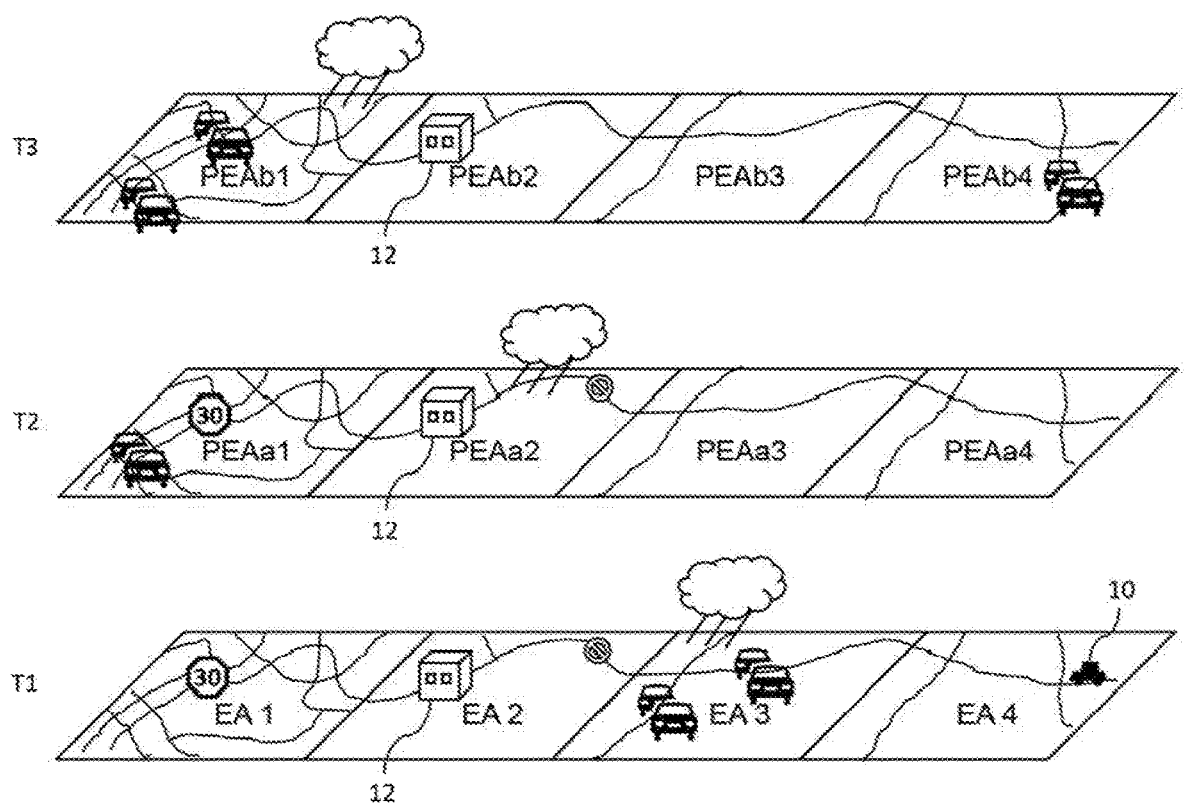
FIG. 19 shows a schematic configuration of a route search performed by the system 100 having the third exemplary configuration according to the present embodiment.

FIG. 19 shows a schematic configuration of a route search performed by the system 100 having the third exemplary configuration according to the present embodiment. FIG. 19 shows an example in which four EAs and eight PEAs are assigned to four areas within a region A. For example, the four EAs from EA1 to EA4 may manage events in the four areas shown corresponding to EA1 to EA4 on the map at the timing T1. Furthermore, the four PEAs from PEAa1 to PEAa4 may manage events in the four areas shown corresponding to PEAa1 to PEAa4 on the map at the timing T2. Yet further, the four PEAs from PEAb1 to PEAb4 may manage events in the four areas shown corresponding to PEAb1 to PEAb4 on the map at the timing T3.

Here, each of the four areas may be substantially the same area at each timing. For example, the areas indicated by EA1, PEAa1, and PEAb1 on the map are substantially the same area. Furthermore, the events managed by EA1 to EA4 may be events occurring at the current timing T1, for example. Furthermore, the expected event at each timing may be an event predicted to occur in a predetermined time interval.

For example, the event predicted to occur in a time interval that is greater than or equal to 30 minutes and less than 90 minutes from the current timing T1 is managed by PEAa1 to PEAa4 as the expected event at the timing T2 that is one hour later. Furthermore, the event predicted to occur in a time interval that is greater than or equal to 90 minutes and less than 150 minutes from the current timing T1 is managed by PEAb1 to PEAb4 as the expected event at the timing T3 that is two hours later. The event occurring at the current timing T1 may include an event predicted to occur in a time interval that is less than 30 minutes from the current timing T1.

FIG. 19 shows an example in which the one mobile object 10 is positioned in the area assigned to EA4 at the timing T1. The following describes an example in which the one mobile object 10 performs a search for a route from the current position to a building 12. Here, the building 12 is positioned in the area assigned to EA2, PEAa2, and PEAb2 at the respective timings.

Here, FIG. 19 shows an example in which, at the current timing T1, a "speed limit" event occurs in a portion of the road managed by EA1, a "closure" event occurs in a portion of the road managed by EA2, and a "traffic jam" event and a "heavy rain" event occur in a portion of the road managed by EA3. In this case, when the route search from the current position of the one mobile object 10 to the building 12 is performed, the one mobile object 10 is notified about the "closure," "traffic jam," and "heavy rain" events occurring in the shortest route. Accordingly, the one mobile object 10 is recommended to select a route that avoids these events.

However, there are cases where a route avoiding these events is not the route adopted for the actual movement, due to the change over time of the events and the movement time of the mobile object 10. For example, as shown in the example of FIG. 19, the "traffic jam" event and the "heavy rain" event managed by EA3 at the timing T1 dissipate at the timing T2. In other words, even if the one mobile object 10 moves in the area assigned to PEAa3 at the timing T2, it is possible for the one mobile object 10 to move smoothly. Accordingly, the one mobile object 10 preferably moves on the shortest route without attempting to intentionally avoid these events.

Here, FIG. 19 shows that PEAa2 manages the occurrence of the "closure" and "heavy rain" expected events at the timing T2. Furthermore, FIG. 19 shows an example in which the "closure" and "heavy rain" expected events managed by PEAa2 at the timing T2 dissipate at the timing T3, and PEAb2 does not manage these expected events. Accordingly, the one mobile object 10 can move smoothly even when moving in the area assigned to PEAb2 at the timing T3, and therefore the one mobile object 10 preferably moves on the shortest route.

In this way, an event moves, occurs, and dissipates along with the passage of time, and therefore it is preferably to perform the route search corresponding to this change of the event in time series. If one mobile object 10 has searched for the shortest route in the area managed by EA4, the system 100 having the third exemplary configuration can acquire not only the events managed by EA2, EA3, and EA4, but also the expected events managed by PEAa2, PEAa3, PEAa4, PEAb2, PEAb3, and PEAb4.

In other words, the system 100 having the third exemplary configuration can, for one mobile object 10, propose a route by which the mobile object 10 can move to the building 12 that is the destination by moving to the area managed by PEAa3 one hour later and then moving to the area managed by PEAb2 two hours later, as the optimal route. In this way, the system 100 having the third exemplary configuration can more accurately assist with the movement of the mobile object 10 by managing, in addition to the events occurring at the timing T1, expected events that are expected to occur in the future after the timing T1.

In this way, even if the mobile object 10 moves for a longer time than the time needed to move directly on the shortest route, due to stops for shopping, meals, visiting customers, or the like while in the process of moving to the destination, for example, the system 100 having the third exemplary configuration can suitably assist with the movement of the mobile object 10. Furthermore, even if the mobile object 10 makes a side trip that does not involve moving on the shortest route, the system 100 having the third exemplary configuration can suitably assist with the movement of the mobile object 10.

Furthermore, the system 100 may update the events and expected events to be managed, according to the passage of time from the timing T1 to the timing T2. Specifically, the PEA updating section 342 may be operable to shift a plurality of the PEAs to be earlier in the time series order, and reassign these PEAs to a plurality of future timings updated using the future timing that follows the earliest future timing as the origin. In this way, if the timing has changed from T1 to T2, for example, the system 100 causes the plurality of EAs to manage events at the timing T2 and causes the plurality of PEAs that managed the events at the timing T2 to manage the expected events at the timing T3.

In this way, the system 100 may update the events managed by the EAs and the PEAs every time a predetermined interval time passes. If a request for a route search is received from a mobile object 10, the system 100 may update the information concerning the events on the shortest route and notify the mobile object 10, every time the interval time passes.

The system 100 having the third exemplary configuration can more accurately assist with the movement of a mobile object 10 by having the PEAs suitably manage the expected events. The following describes the expected event management operation of the system 100 having the third exemplary configuration.

Figure 20:
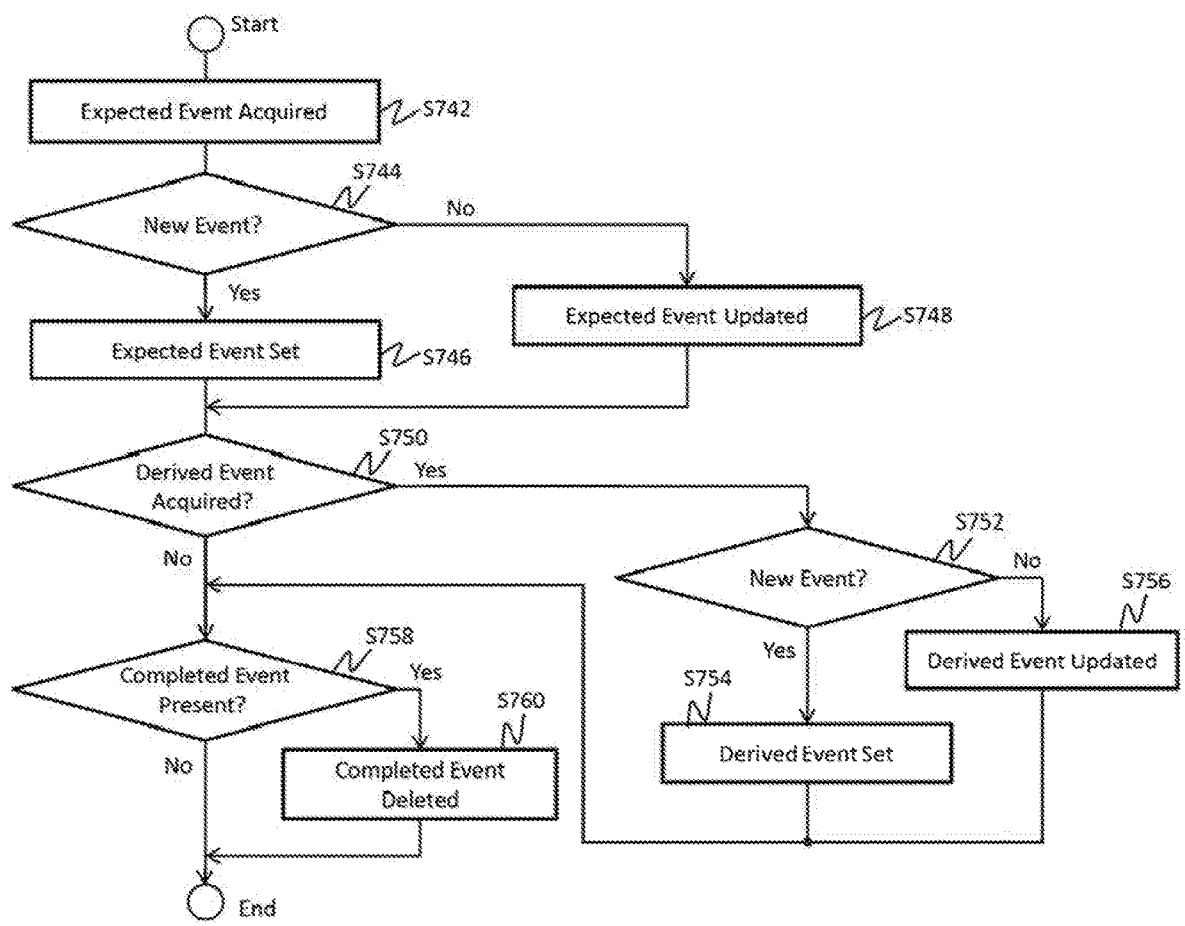
FIG. 20 shows a third exemplary operational flow of the system 100 having the third exemplary configuration according to the present embodiment.

FIG. 20 shows a third exemplary operational flow of the system 100 having the third exemplary configuration according to the present embodiment. The event server 210 according to the present embodiment may perform the operational flow shown in FIG. 20 to manage the expected events in the geographic space. Specifically, the operational flow shown in FIG. 20 may be performed by the event server 210 in addition to or instead of the event server processing (S650) described in FIG. 6 and FIG. 8.

First, at S742, the PEA acquires the information concerning the expected event to be managed. The PEA may acquire an event generated by the predictive event generating section 334. In other words, the PEA may receive information concerning the expected event according to the operation of S716 described in FIG. 17.

Next, at S744, the PEA judges whether the received expected event is a new event. The PEA may determine whether the event is new by making a comparison with the expected event history. For example, the PEA judges whether the event is new by comparing the type, position on the map, expected movement direction, expected movement speed, existence probability, dissipation probability, change probability, and the like of the expected event to the history of past expected events.

If a corresponding expected event does not exist in the past history, the PEA may judge that the event is a new event (S744: Yes), and set this expected event at S746. The PEA may set the expected event in association with the type, position on the map, expected movement direction, expected movement speed, existence probability, dissipation probability, change probability, and the like.

Furthermore, if a corresponding expected event does exist in the past history, the PEA may judge that the event is not a new event (S744: No). In this case, at S748, the PEA may update this expected event. The PEA may update the position on the map, expected movement direction, expected movement speed, existence probability, dissipation probability, change probability, and the like, according to the received information concerning the expected event. Furthermore, the PEA may update another expected event currently occurring. In this case, the PEA may move the position of the other expected event according to the expected movement direction and the expected movement speed. Furthermore, the PEA may increase or decrease the existence probability of the other expected event, according to the dissipation probability.

Here, if the predictive event generating section 334 further predicts a derived expected event that is predicted to derive from the generated expected event, the PEA may acquire this derived expected event at S750. If the derived expected event is acquired (S750: Yes), the PEA may judge whether the received derived expected event is a new event at S752. The PEA may judge whether the derived expected event is a new event in the same manner as the judgment for the expected event.

If it is judged that the derived expected event is a new event (S752: Yes), the PEA may set this derived expected event at S754. If it is judged that the derived expected event is not a new event (S752: No), the PEA may update this derived expected event at S756. Furthermore, the PEA may update another derived expected event, in the same manner as the expected event.

Next, at S758, the PEA may detect a completed event, from among the updated expected events and derived expected events. For example, the PEA may set an event whose existence probability is less than a predetermined threshold value to be a completed event. Furthermore, the PEA processing section 340 may notify the PEA about the information concerning an event that has been completed or an event that did not actually occur in the geographic space, among the expected events generated by the predictive event generating section 334.

If storage of an expected event continues for longer than a predetermined reference time and there is an event present for which notification indicating the event is an expected event has not been received from the predictive event generating section 334, the PEA may delete this event. Furthermore, the PEA may make an inquiry to a nearby mobile object agent about whether such an event actually exists. In the manner described above, if there is a completed event or an event that did not actually occur in the geographic space (S758: Yes), the PEA can remove and delete this completed event at S760.

The PEA can set and manage the expected events by performing the operation described above. Furthermore, the PEA can reduce the increase in the processing load caused by an increase in unnecessary event information, by deleting the completed events. In this way, the system 100 having the third exemplary configuration manages the expected events based on the results obtained by the PEA monitoring the events, and can therefore suitably manage the expected events.

In the system 100 having the third exemplary configuration described above, the predictive event generating section 334 generates an event expected based on the time series change of an event handled by the EA as the expected event. For example, the predictive event generating section 334 is described as transmitting one expected event to the PEA assigned to one region, in response to the event occurring in the one region to which one EA is assigned according to the processing of the one EA.

Here, there are cases where an event that has occurred in one region is expected to move to another adjacent region at the next timing. In such a case, the predictive event generating section 334 may generate the expected event in the other region adjacent thereto based on the event that occurred in the one region. Specifically, the predictive event generating section 334 may be operable to generate one expected event positioned in a region adjacent to the one region in correspondence with the event generated in the one region to which one EA is assigned, according to the processing of the one EA. Furthermore, the predictive event generating section 334 may be operable to transmit one expected event to an adjacent PEA assigned to an adjacent region, in response to the one expected event being generated in the adjacent region.

The predictive event generating section 334 may be operable to, if one expected event generated according to the processing of one EA is transmitted to an adjacent PEA assigned to an adjacent region, transmit the this one expected event to the adjacent PEA via an adjacent EA assigned to the adjacent region. In this way, even if an event is expected to move from an area managed by an EA to an area adjacent thereto, the system 100 having the third exemplary configuration can generate an expected event in the adjacent area.

In the system 100 having the third exemplary configuration described above, the EA handles an event and the PEA handles an expected event obtained by predicting the change in time series of the event handled by the EA. Here, the event that changes in time series can occur as an event relating to the environment of a plurality of mobile objects 10, and therefore an environment agent that is independent from the EA may handle the time-series event. In this case, a predictive environment agent may handle the expected events at the future timings, independently from the EA. In this case, the subsystem 200 may further include an environment agent server that is independent from the event server 210. Specifically, the environment agent server may be operable to execute the environment agent and the predictive environment agent.

Figure 21:
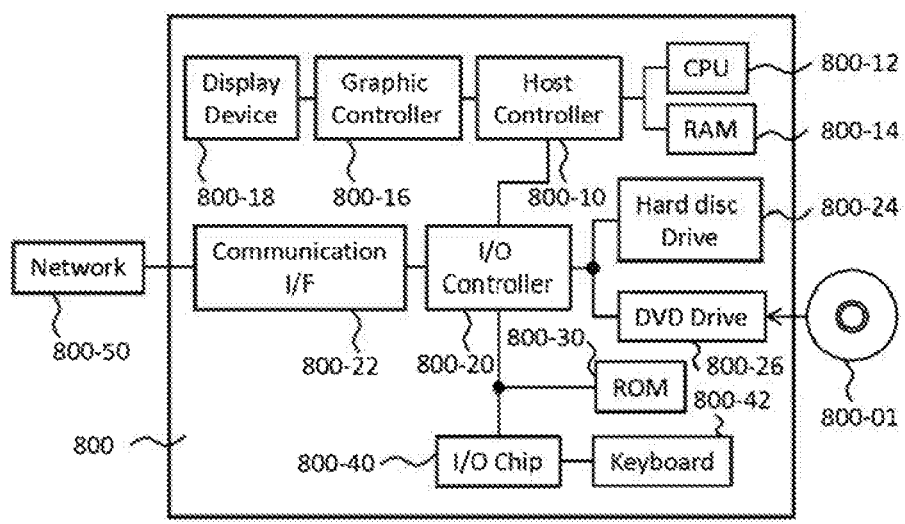
FIG. 21 shows a computer according to an embodiment of the invention.

FIG. 21 shows an exemplary hardware configuration of a computer according to the embodiment of the invention. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program may be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 may also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method may be constituted by realizing the operation or processing of information in accordance with the usage of the computer 800.

For example, when communication is performed between the computer 800 and an external device, the CPU 800-12 may execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 may then write back the processed data to the external recording medium.

Various types of information, such as various types of programs, data, tables, and databases, may be stored in the recording medium to undergo information processing. The CPU 800-12 may perform various types of processing on the data read from the RAM 800-14, which includes various types of operations, processing of information, condition judging, conditional branch, unconditional branch, search/replace of information, etc., as described throughout this disclosure and designated by an instruction sequence of programs, and writes the result back to the RAM 800-14. In addition, the CPU 800-12 may search for information in a file, a database, etc., in the recording medium. For example, when a plurality of entries, each having an attribute value of a first attribute is associated with an attribute value of a second attribute, are stored in the recording medium, the CPU 800-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

What is claimed is:

1. A method comprising:
   identifying, by an event agent (EA), an event occurring in a geographic space in which a plurality of mobile objects move;
   determining the event is an expected event based on predicting time-series changes of the event handled by the EA, wherein determining the event is the expected event includes determining a plurality of the events correspond respectively to a plurality of future timings, and wherein determining the event is the expected event includes updating a plurality of predictive environment agent (PEA)s in response to reaching an earliest future timing among the plurality of future timings, according to passage of time; and managing a mobile object based on the expected event, wherein managing the mobile object comprises performing automatic driving and/or driving assist.

2. The method according to claim 1, wherein
updating the plurality of PEAs includes shifting the plurality of PEAs to be earlier in time series order, and reassigning the plurality of PEAs to a plurality of future timings updated with a future timing following the earliest future timing as an origin.

3. The method according to claim 1, wherein
determining the event is the expected event includes associating information including at least one of an expected movement direction, an expected movement speed, an existence probability, a dissipation probability, and a change probability with the expected event.

4. The method according to claim 1, wherein
identifying, by the event agent (EA), the event occurring in the geographic space in which a plurality of mobile objects move includes event generation of generating the event based on at least one of input information that is input from outside and detection information that is detected by at least one mobile object among the plurality of mobile objects.

5. The method according to claim 4, wherein
identifying, by the event agent (EA), the event occurring in the geographic space in which a plurality of mobile objects move further includes expected event generation of generating the expected event to be handled by each of at least one of the plurality of PEAs, based on identifying the event.

6. The method according to claim 5, wherein
the EA and a plurality of PEAs are assigned for every same region in the geographic space.

7. The method according to claim 1, further comprising:
a mobile object agent associated with each of the plurality of mobile objects, wherein
managing the mobile object based on the expected event includes receiving a request from one mobile object agent associated with the mobile object and reporting information concerning the expected event handled by the predicted event agent associated with a passage timing at which the mobile object passes through a geographic point, among a plurality of mobile object agents, to the one mobile object agent.

8. The method according to claim 7, wherein
the mobile object agent processing includes assisting with movement of the one mobile object based on information concerning the expected event.

9. A computer program product for managing mobile object, the computer program product comprising:
a non-transitory computer-readable storage device and program instructions stored on the non-transitory computer-readable storage device, the program instructions comprising:
identifying, by an event agent (EA), an event occurring in a geographic space in which a plurality of mobile objects move;
determining the event is an expected event based on predicting time-series changes of the event handled by the EA, wherein determining the event is the expected event includes determining a plurality of the events correspond respectively to a plurality of future timings, and wherein determining the event is the expected event includes updating a plurality of predictive environment agent (PEA)s in response to reaching an earliest future timing among the plurality of future timings, according to passage of time; and
managing a mobile object based on the expected event, wherein managing the mobile object comprises performing automatic driving and/or driving assist.

10. The computer program product according to claim 9, wherein
updating the plurality of PEAs includes shifting the plurality of PEAs to be earlier in time series order, and reassigning the plurality of PEAs to a plurality of future timings updated with a future timing following the earliest future timing as an origin.

11. The computer program product according to claim 9, wherein
determining the event is the expected event includes associating information including at least one of an expected movement direction, an expected movement speed, an existence probability, a dissipation probability, and a change probability with the expected event.

12. The computer program product according to claim 9, wherein
identifying, by the event agent (EA), the event occurring in the geographic space in which a plurality of mobile objects move includes event generation of generating the event based on at least one of input information that is input from outside and detection information that is detected by at least one mobile object among the plurality of mobile objects.

13. The computer program product according to claim 12, wherein
identifying, by the event agent (EA), the event occurring in the geographic space in which a plurality of mobile objects move further includes expected event generation of generating the expected event to be handled by each of at least one of the plurality of PEAs, based on identifying the event.

14. The computer program product according to claim 13, wherein
the EA and the plurality of PEAs are assigned for every same region in the geographic space.

15. The computer program product according to claim 9, further comprising:
a mobile object agent associated with each of the plurality of mobile objects, wherein
managing the mobile object based on the expected event includes receiving a request from one mobile object agent associated with the mobile object and reporting information concerning the expected event handled by the predicted event agent associated with a passage timing at which the mobile object passes through a geographic point, among a plurality of mobile object agents, to the one mobile object agent.

16. The computer program product according to claim 15, wherein
the mobile object agent processing includes assisting with movement of the one mobile object based on information concerning the expected event.

17. A computer system for managing mobile object, the computer system comprising:
a processor, a computer-readable tangible storage device, and program instructions stored on computer-readable tangible storage device for execution by the processor, the program instructions comprising:
identifying, by an event agent (EA), an event occurring in a geographic space in which a plurality of mobile objects move;
determining the event is an expected event based on predicting time-series changes of the event handled by the EA, wherein determining the event is the expected event includes determining a plurality of the events correspond respectively to a plurality of future timings, and wherein determining the event is the expected event includes updating a plurality of predictive environment agent (PEA)s in response to reaching an earliest future timing among the plurality of future timings, according to passage of time; and managing a mobile object based on the expected event, wherein managing the mobile object comprises performing automatic driving and/or driving assist.

18. The computer system according to claim 17, wherein updating the plurality of PEAs includes shifting the plurality of PEAs to be earlier in time series order, and reassigning the plurality of PEAs to a plurality of future timings updated with a future timing following the earliest future timing as an origin.

19. The computer system according to claim 17, wherein determining the event is the expected event includes associating information including at least one of an expected movement direction, an expected movement speed, an existence probability, a dissipation probability, and a change probability with the expected event.

20. The computer system according to claim 17, wherein identifying, by the event agent (EA), the event occurring in the geographic space in which a plurality of mobile objects move includes event generation of generating the event based on at least one of input information that is input from outside and detection information that is detected by at least one mobile object among the plurality of mobile objects.

* * * * *